US011861737B1

(12) United States Patent
Bull et al.

(10) Patent No.: US 11,861,737 B1
(45) Date of Patent: Jan. 2, 2024

(54) HYBRID SEED SUPPLY MANAGEMENT BASED ON PRESCRIPTION OF HYBRID SEED PLACEMENT

(71) Applicant: CLIMATE LLC, Saint Louis, MO (US)

(72) Inventors: Jason Kendrick Bull, St. Louis, MO (US); Timothy Reich, Ballwin, MO (US); Yao Xie, St. Louis, MO (US); Xiao Yang, Chesterfield, MO (US); Tonya S. Ehlmann, San Francisco, CA (US)

(73) Assignee: CLIMATE LLC, Saint Louis, MO (US)

( * ) Notice: Subject to any disclaimer, the term of this patent is extended or adjusted under 35 U.S.C. 154(b) by 311 days.

(21) Appl. No.: 16/555,512

(22) Filed: Aug. 29, 2019

Related U.S. Application Data

(60) Provisional application No. 62/726,142, filed on Aug. 31, 2018.

(51) Int. Cl.
*G06Q 50/02* (2012.01)
*G06Q 10/0635* (2023.01)
(Continued)

(52) U.S. Cl.
CPC .............. *G06Q 50/02* (2013.01); *A01C 14/00* (2013.01); *G06Q 10/0635* (2013.01); *G06Q 10/06315* (2013.01)

(58) Field of Classification Search
CPC .... G06Q 50/02; G06Q 10/087; G06Q 10/063; A01C 7/105; A01C 7/08; A01C 7/102;
(Continued)

(56) References Cited

U.S. PATENT DOCUMENTS 8,626,698 B1   1/2014  Nikolaev et al.
10,028,451 B2 *  7/2018  Rowan .................... G06F 30/20
(Continued)

OTHER PUBLICATIONS

Decision Support Software for Farm Management—User Guide Ag Decisions, 1997 (Year: 1997).*
(Continued)

*Primary Examiner* — Scott L Jarrett
(74) *Attorney, Agent, or Firm* — Harness, Dickey & Pierce, P.L.C.

(57) ABSTRACT

A server computer system receives a dataset of candidate hybrid seeds for planting on one or more target fields, which comprises data regarding one or more hybrid seeds, probability of success values associated with each of the one or more hybrid seeds that describe a probability of a successful yield, and historical agricultural data associated with each of the one or more hybrid seeds further receives one or more properties for one or more target fields, and selects a subset of the one or more hybrid seeds based on the probabilities of success values. The server computer system generates representative yield values for hybrid seeds in the subset based on the historical agricultural data, generates a dataset of risk values for the subset, which describes an amount of risk associated with the representative yield values for each hybrid seed in the subset based on the historical agricultural data associated with each hybrid seed in the subset, and selects a list of target hybrid seeds from the subset for planting on the one or more target fields based on the dataset of risk values, the representative yield values for the subset, and the one or more properties for the one or more target fields. In addition, the server computer system generates a prescription related to planting the list of target hybrid seeds in the one or more target fields for a next period determines a safety stock for the list for the next period with respect to
(Continued)

US 11,861,737 B1

Page 2 a supply chain based on the prescription, and causes displaying values of the safety stock, thereby causing production of the safety stock.

7 Claims, 13 Drawing Sheets

(51) Int. Cl.
*G06Q 10/0631* (2023.01)
*A01C 14/00* (2006.01)

(58) Field of Classification Search
CPC ....... A01C 21/007; A01C 7/046; A01C 7/107; A01C 21/005; A01C 21/00; A01C 14/00; A01C 7/00; A01B 79/005; A01B 69/00; A01B 69/004
See application file for complete search history.

(56) References Cited

U.S. PATENT DOCUMENTS

| | | | | |
|---|---|---|---|---|
| 10,398,096 | B2* | 9/2019 | Hassanzadeh | A01G 7/00 |
| 10,667,474 | B2* | 6/2020 | Rowan | A01C 21/005 |
| 10,993,365 | B2* | 5/2021 | Bull | A01C 7/102 |
| 11,080,798 | B2* | 8/2021 | Ethington | G06Q 10/04 |
| 11,474,523 | B2* | 10/2022 | Vandike | A01D 41/127 |
| 11,562,444 | B2* | 1/2023 | Reich | G06N 3/006 |
| 11,564,345 | B1* | 1/2023 | Dharna | G06N 7/01 |
| 11,568,340 | B2* | 1/2023 | Ehlmann | A01C 21/005 |
| 11,568,467 | B2* | 1/2023 | Jiang | G06N 20/00 |
| 11,593,674 | B2* | 2/2023 | Jiang | G16B 20/20 |
| 11,610,272 | B1* | 3/2023 | McEntire | G06N 5/01 |
| 11,636,414 | B1* | 4/2023 | Dobbins | G06Q 10/06315 705/7.17 |
| 11,653,588 | B2* | 5/2023 | Vandike | A01D 41/127 700/44 |
| 11,678,619 | B2* | 6/2023 | Rowan | A01G 22/00 701/50 |
| 2002/0022928 | A1* | 2/2002 | Ell | G06Q 10/04 702/2 |
| 2002/0103668 | A1 | 8/2002 | Ecklund | |
| 2002/0103688 | A1 | 8/2002 | Schneider | |
| 2002/0183867 | A1* | 12/2002 | Gupta | G06Q 20/203 700/28 |
| 2003/0018431 | A1* | 1/2003 | Hanson | A01B 79/005 702/5 |
| 2005/0150160 | A1* | 7/2005 | Norgaard | A01G 2/00 47/58.1 SE |
| 2006/0282228 | A1 | 12/2006 | Ethington | |
| 2006/0282467 | A1* | 12/2006 | Peterson | G06Q 50/02 |
| 2008/0040165 | A1* | 2/2008 | Anderson | G06Q 50/02 705/4 |
| 2011/0054921 | A1* | 3/2011 | Lynds | G06Q 10/04 705/1.1 |
| 2013/0018586 | A1* | 1/2013 | Peterson | G06Q 50/02 702/19 |
| 2013/0124055 | A1* | 5/2013 | Baurer | H04L 5/0053 701/461 |
| 2013/0174040 | A1* | 7/2013 | Johnson | G06Q 10/06 715/733 |
| 2014/0108060 | A1* | 4/2014 | Anderson, Jr. | G06Q 40/08 705/4 |
| 2014/0165891 | A1* | 6/2014 | Garner | A01C 7/046 111/170 |
| 2014/0189903 | A1 | 7/2014 | Duncan et al. | |
| 2014/0278731 | A1* | 9/2014 | Griffin | G06Q 50/02 705/7.28 |
| 2015/0248720 | A1 | 9/2015 | Brown | |
| 2015/0278967 | A1 | 10/2015 | Jump | |
| 2016/0053322 | A1* | 2/2016 | Nelson | C12Q 1/6883 536/24.31 |
| 2016/0073573 | A1* | 3/2016 | Ethington | G06Q 10/06 705/7.36 |
| 2016/0078375 | A1* | 3/2016 | Ethington | G06Q 10/06 705/7.27 |
| 2016/0078569 | A1 | 3/2016 | Ethington | |
| 2016/0224703 | A1 | 8/2016 | Shriver | |
| 2016/0247082 | A1* | 8/2016 | Stehling | G06N 7/01 |
| 2017/0105335 | A1 | 4/2017 | Xu et al. | |
| 2017/0169523 | A1* | 6/2017 | Xu | G06Q 10/06315 |
| 2017/0196171 | A1* | 7/2017 | Xu | A01C 21/005 |
| 2017/0228475 | A1* | 8/2017 | Aldor-Noiman | G06Q 10/06 |
| 2017/0270446 | A1* | 9/2017 | Starr | G06Q 10/06313 |
| 2018/0132422 | A1* | 5/2018 | Hassanzadeh | G06Q 50/02 |
| 2018/0132423 | A1* | 5/2018 | Rowan | G06Q 10/063 |
| 2018/0181893 | A1* | 6/2018 | Basso | G06Q 10/06 |
| 2019/0014727 | A1* | 1/2019 | Rowan | G06Q 50/02 |
| 2019/0050948 | A1* | 2/2019 | Perry | A01B 79/005 |
| 2019/0057461 | A1* | 2/2019 | Ruff | F24F 11/49 |
| 2019/0090432 | A1* | 3/2019 | Duquette | G06Q 50/02 |
| 2019/0124855 | A1* | 5/2019 | Rowan | G06F 30/20 |
| 2019/0138962 | A1* | 5/2019 | Ehlmann | G06Q 10/06313 |
| 2019/0139158 | A1* | 5/2019 | Reich | G06N 7/01 |
| 2019/0357425 | A1* | 11/2019 | Dharna | A01B 79/005 |
| 2020/0005166 | A1* | 1/2020 | Reich | G06N 5/04 |
| 2020/0005401 | A1* | 1/2020 | Bull | G06Q 10/06393 |
| 2020/0008371 | A1* | 1/2020 | Hassanzadeh | A01G 7/00 |
| 2020/0077574 | A1* | 3/2020 | Bull | A01B 79/005 |
| 2020/0272971 | A1* | 8/2020 | Ruff | G06Q 50/02 |
| 2022/0015308 | A1* | 1/2022 | Hassanzadeh | G06Q 50/02 |
| 2023/0169428 | A1* | 6/2023 | Bull | G06Q 50/02 705/7.23 |
| 2023/0177622 | A1* | 6/2023 | Bull | A01B 79/005 705/7.11 |

OTHER PUBLICATIONS

Canada Patent Office, "Office Action" in application No. 3,081,024, dated Dec. 11, 2020, 9 pages.
Canada Claims in application No. 3,081,024, dated Dec. 2020, 6 pages.
The International Bureau of WIPO, "International Preliminary Report on Patentability", in application No. PCT/US2018/059844, dated May 12, 2020, 9 pages.
The Internationa Bureau of WIPO, "International Preliminary Report on Patentability", in application No. PCT/US2018/059848, dated May 12, 2020, 7 pages.
Current Claims in application No. PCT/US2018/059848, dated May 2020, 6 pages.
Current Claims in application No. PCT/US2018/059844, dated May 2020, 7 pages.
Reich, U.S. Appl. No. 15/807,876, filed Nov. 9, 2017, Advisory Action, dated Dec. 18, 2020.
Ehlmann, U.S. Appl. No. 15/807,872, filed Nov. 9, 2017, Advisory Action, dated Dec. 18, 2020.
Reich, U.S. Appl. No. 15/807,876, filed Nov. 9, 2017, Final Office Action, dated Oct. 9, 2020.
Reich, U.S. Appl. No. 15/807,876, filed Nov. 9, 2017, Interview Summary, dated Aug. 10, 2020.
Ehlmann, U.S. Appl. No. 15/807,872, filed Nov. 9, 2017, Interview Summary, dated Aug. 10, 2020.
Ehlmann, U.S. Appl. No. 15/807,872, filed Nov. 9, 2017, Final Office Action, dated Oct. 9, 2020.
The International Searching Authority, "Search Report" in application No. PCT/US2018/059848, dated Jan. 17, 2019, 10 pages.
The International Searching Authority, "Search Report" in application No. PCT/US2018/059844, dated Jan. 18, 2019, 12 pages.
Nocco et al., "Enterprise Risk Management: Theory and Practice", in Journal of applied corporate finance, dated Dec. 7, 2006, 15 pages.
Miao et al., "Within-field Variation in Corn Yield and Grain Quality Responses to Nitrogen Fertrilization and Hybrid Selection", In Agronomy Journal, dated Jan. 2006, 13 pages.
Engle, "Risk and Volatility: Econometric Models and Financial Practice", In: American Economic Review, dated Dec. 8, 2003, 24 pages.

(56) References Cited

OTHER PUBLICATIONS

Current Claims in application No. PCT/US2018/059848, dated Jan. 2019, 6 pages.
Current Claims in application No. PCT/US2018/059844, dated Jan. 2019, 7 pages.
Reich, U.S. Appl. No. 15/807,876, filed Nov. 9, 2017, Office Action, dated Aug. 30, 2019.
Ehlmann, U.S. Appl. No. 15/807,872, filed Nov. 9, 2017, Office Action, dated Aug. 29, 2019.
Reich, U.S. Appl. No. 15/807,876, filed Nov. 9, 2017, Final Office Action, dated Jan. 24, 2020.
Ehlmann, U.S. Appl. No. 15/807,872, filed Nov. 9, 2017, Final Office Action, dated Jan. 24, 2020.

* cited by examiner

Fig. 2
(a)
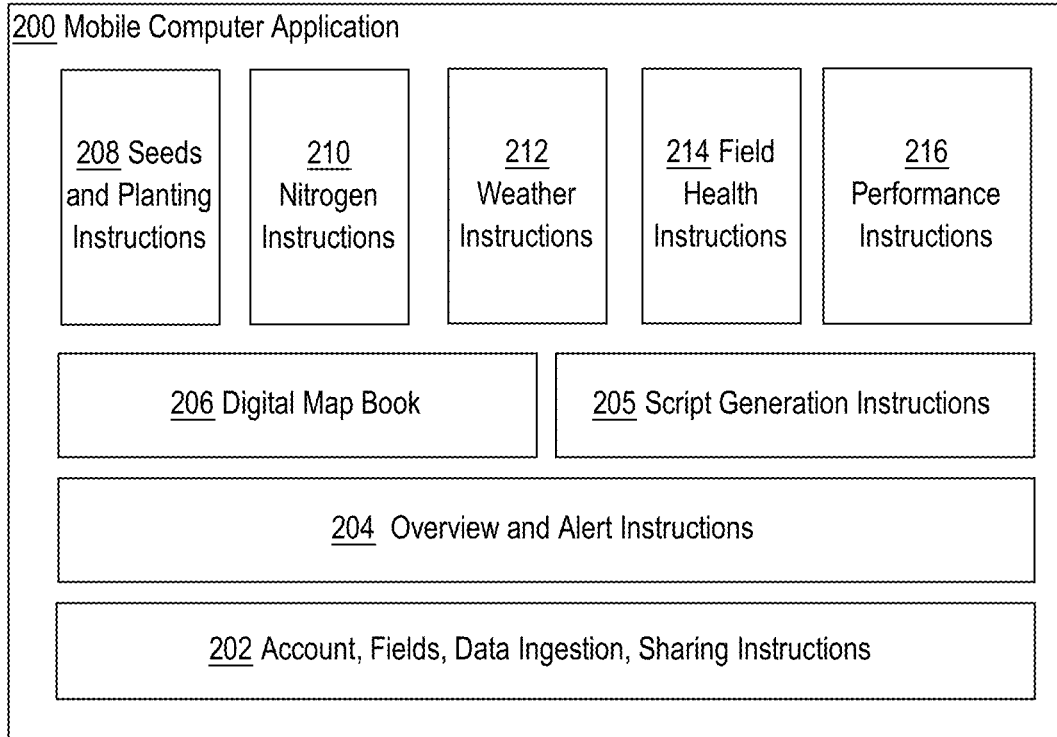
(b)
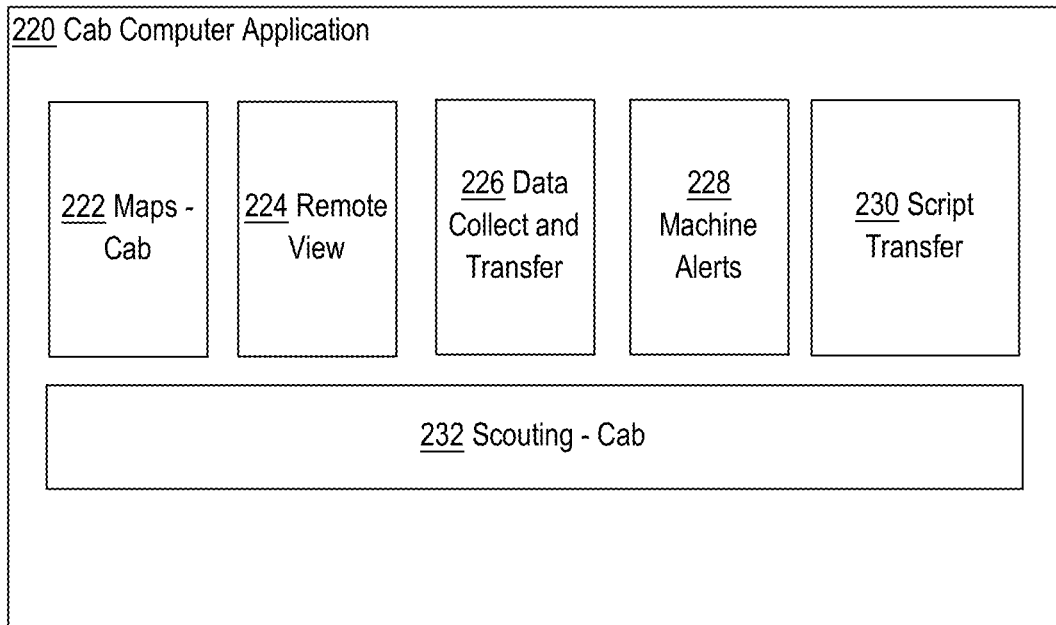

FIG. 5

Data Manager

| | Nitrogen | Planting | Practices | Soil | |
|---|---|---|---|---|---|

| Planting 1 (4 Fields) | Planting 2 (0 Fields) | Planting 3 (0 Fields) | Planting 4 (1 Fields) | Add New Planting Plan |
|---|---|---|---|---|
| Crop Corn Product | Crop Corn Product | Crop Corn Product | Crop Corn Product | |
| Plant Date: 2016-04-12 | Plant Date: 2016-04-15 | Plant Date: 2016-04-13 | Plant Date: 2016-04-13 | |
| ILU 112 \| Pop: 34000 | ILU 83 \| Pop: 34000 | ILU 83 \| Pop: 34000 | ILU 112 \| Pop: 34000 | |
| [Edit] [Apply] | [Edit] [Apply] | [Edit] [Apply] | [Edit] [Apply] | |

| | | CROP | PLANTED ACRES | PRODUCT | RELATIVE MATURITY | TARGET YIELD | POPULATION (AVG) | PLA |
|---|---|---|---|---|---|---|---|---|
| ☐ | Select All | | | | | | | |
| ☐ | Ames, IA 1<br>Corn \| 100 \| Boone, IA | Corn | --- | DMC82-M | 112 | 160 | 34000 | Apr |
| ☐ | Austin, MN 1<br>Corn \| 100 \| Fredricks, MN | Corn | --- | DMC82-M | 114 | [160] | 36000 | Apr |
| ☐ | Boone, IN 1<br>Corn \| 100 \| Boone, IA | Corn | --- | DMC82-M | 112 | 150 | 34000 | Apr |
| ☐ | Champaign 1<br>Corn \| 100 \| Champaign, IL | Corn | --- | --- | 112 | 200 | 34000 | Apr |
| ☐ | E Nebraska 1<br>Corn \| 100 \| Burt, NE | Corn | --- | --- | 112 | 160 | 34000 | Apr |

*FIG. 6*

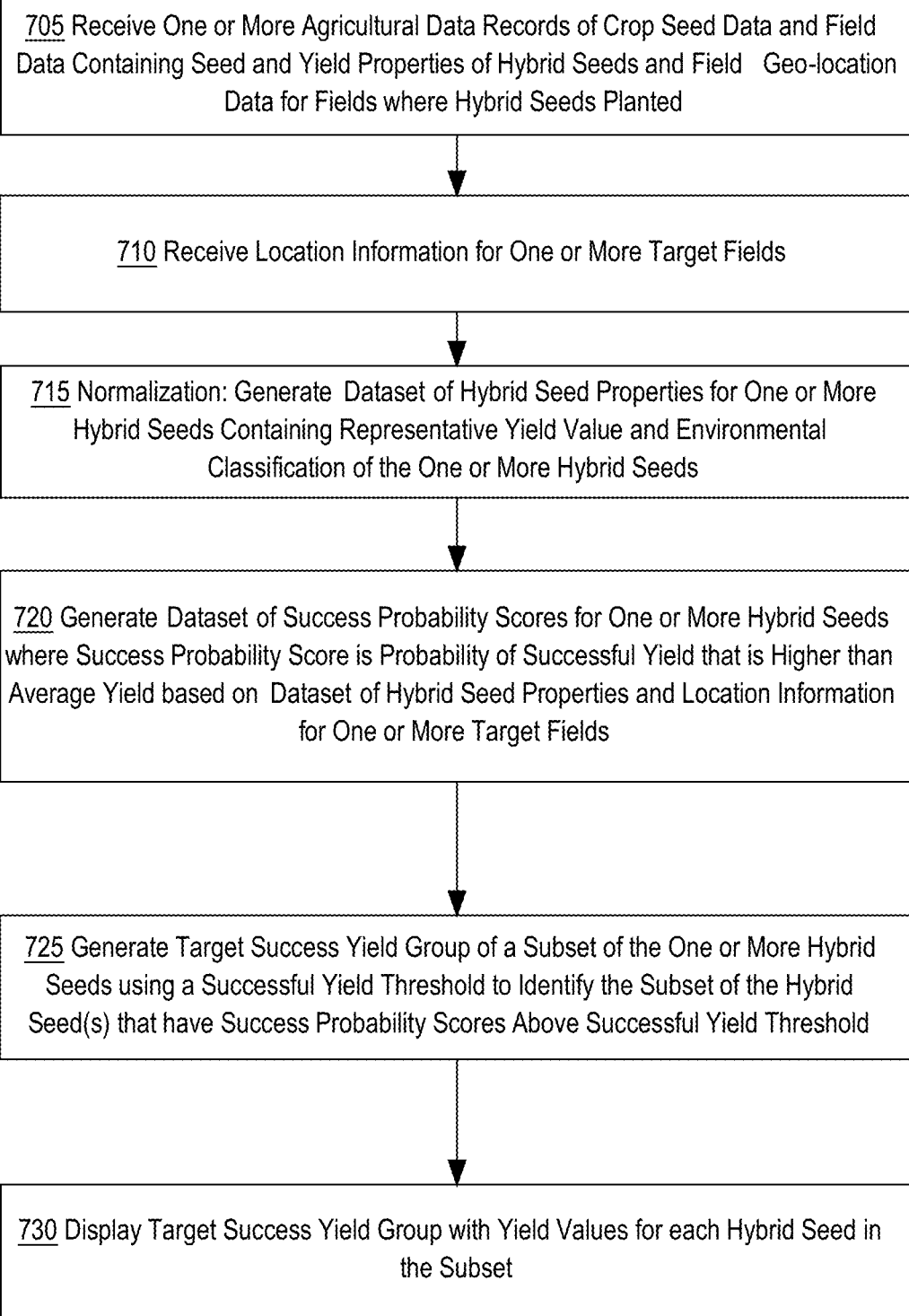

FIG. 12

| Field | Description |
|---|---|
| Scenario | The scenario for which the output data was generated. |
| Site Name | The name of the site at which the demand occurs. |
| Product Name | The name of the product demanded at the site. |
| Period Name | The period in which the demand occurs. |
| Total Demand Qty | Total demand quantity calculated from demand mean and period length. Demand in incomplete aggregation periods is not included. |
| Non-zero Demand Mean | Average demand size during the period at the given site. This does not include aggregation periods with zero demand. |
| Non-zero Demand Std Dev | Standard deviation of demand size during the period at the given site. This does not include aggregation periods with zero demand. |
| Demand Mean | Average demand per aggregation period during the period at the given site. |
| Demand Std Dev | Standard deviation of the aggregated demand during the period at the given site. |
| Min Non-zero Demand | The minimum aggregated demand for the product at the site in this period. This value does not include zero demand. Note: This value is not available when using Formula as the Propagation Method. |
| Max Non-zero Demand | The maximum aggregated demand for the product at the site in this period. Note: This value is not available when using Formula as the Propagation Method. |
| Potential Revenue | The possible revenue based on Total Demand * (Product) Price. Note: (Demand) Unit Price will be supported in future. |
| Total Cost | The total product cost based on the Total Demand * Unit Cost. |
| Total Weight | The total product weight based on the Total Demand * Unit Weight. |
| Total Cubic | The total product cube based on the Total Demand * Unit Cubic. |

1220  1222

1202 — Scenario, Site Name, Product Name, Period Name
1204 — Total Demand Qty
1206 — Non-zero Demand Mean, Non-zero Demand Std Dev
1208 — Demand Mean, Demand Std Dev
1210 — Min Non-zero Demand, Max Non-zero Demand
1212 — Potential Revenue, Total Cost, Total Weight, Total Cubic

FIG. 13

1302 Receive a dataset of candidate hybrid seeds for planting on one or more target fields, the dataset of candidate hybrid seeds comprising data regarding one or more hybrid seeds, probability of success values associated with each of the one or more hybrid seeds that describe a probability of a successful yield, and historical agricultural data associated with each of the one or more hybrid seeds

1304 Receive one or more properties for one or more target fields

1306 Select a subset of the one or more hybrid seeds based on the probabilities of success values associated with each of the one or more hybrid seeds

1308 Generate representative yield values for hybrid seeds in the subset of the one or more hybrid seeds based on the historical agricultural data

1310 Generate a dataset of risk values for the subset of the one or more hybrid seeds, the dataset of risk values describe an amount of risk associated with the representative yield values for each hybrid seed in the subset of the one or more hybrid seeds based on the historical agricultural data associated with each hybrid seed in the subset of the one or more hybrid seeds

1312 Select a list of target hybrid seeds, from the subset of the one or more hybrid seeds, for planting on the one or more target fields based on the dataset of risk values, the representative yield values for the subset of the one or more hybrid seeds, and the one or more properties for the one or more target fields

1314 Generate a prescription related to planting the list of target hybrid seeds in the one or more target fields for a next period

1316 Determine a safety stock for the list of target hybrid seeds for the next period with respect to a supply chain based on the prescription

1318 Cause displaying values of the safety stock, thereby causing production of the safety stock

HYBRID SEED SUPPLY MANAGEMENT BASED ON PRESCRIPTION OF HYBRID SEED PLACEMENT

This application claims the benefit under 35 U.S.C. § 119(e) of provisional application 62/726,142, filed Aug. 31, 2018, the entire contents of which are hereby incorporated by reference for all purposes as if fully set forth herein. Applicant hereby rescinds any disclaimer of claim scope in the parent application or the prosecution history thereof and advises the USPTO that the claims in this application may be broader than any claim in the parent application.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2019 The Climate Corporation.

FIELD OF THE DISCLOSURE

The present disclosure relates to computer systems useful in agriculture. The present disclosure relates more specifically to computer systems that are programmed to use agricultural data related to hybrid seeds and one or more target fields to estimate a set of hybrid seeds to be planted in the one or more target fields and further manage stock availability and supply of the set of hybrid seeds to the one or more target fields.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A seed supplier generally would like grow hybrid seed volumes associated with high operational efficiency and large demand. The operational efficiency may depend on the making, packaging, or distribution of the hybrid seeds. The demand may be tied to the conditions of individual fields where the seeds are to be grown. A higher demand for a hybrid seed often comes from a higher expected yield.

More broadly, a successful harvest depends on many factors including hybrid selection, soil fertilization, irrigation, and pest control which each contribute to the growth rate of corn plants. Choosing which hybrid seeds to plant on target fields is among the more important agricultural management factors. Varieties of hybrid seeds range from hybrids suited for short growth seasons to longer growth seasons, hotter or colder temperatures, dryer or wetter climates, and different hybrids suited for specific soil compositions. Achieving optimal performance for a specific hybrid seed depends on whether the field conditions align with the optimal growing conditions for the specific hybrid seed. For example, a specific corn hybrid may be rated to produce a specific amount of yield for a grower however, if the field conditions do not match the optimal conditions used to rate the specific corn hybrid it is unlikely that the corn hybrid will meet the yield expectations for the grower.

Once a set of hybrid seeds are chosen for planting, what is to be determined next for a grower is a planting strategy. Planting strategies include determining the amount and placement of each of the chosen hybrid seeds. Strategies for determining amount and placement may dictate whether harvest yield meet expectations. For example, planting hybrid seeds that have similar strengths and vulnerabilities may result in a good yield if conditions are favorable. However, if conditions fluctuate, such as receiving less than expected rainfall or experiencing higher than normal temperatures, then overall yield for similar hybrid seeds may be diminished. A diversified planting strategy may be preferred to overcome unforeseen environmental fluctuations.

With these planting strategies or prescriptions of hybrid seed placements available for the target fields, it is then possible to improve supply efficiency by better aligning supply with market demand. Techniques described herein help determine what seeds to plant in which fields by hybrid seed consumers and in turn how much hybrid seed volumes to produce by seed suppliers.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 5 depicts an example embodiment of a timeline view for data entry.

FIG. 6 depicts an example embodiment of a spreadsheet view for data entry.

FIG. 7 depicts an example flowchart for generating a target success yield group of hybrid seeds identified for optimal yield performance on target fields based on agricultural data records of the hybrid seeds and geo-location data associated with the target fields.

FIG. 12 illustrates one example definition of a facility demand profile that characterizes aggregate customer demand during one or more aggregation periods at a distribution facility.

FIG. 13 illustrates an example process performed by a computer system of managing supply of hybrid seeds based on hybrid seed placement prescriptions.

DETAILED DESCRIPTION

Figure 1:
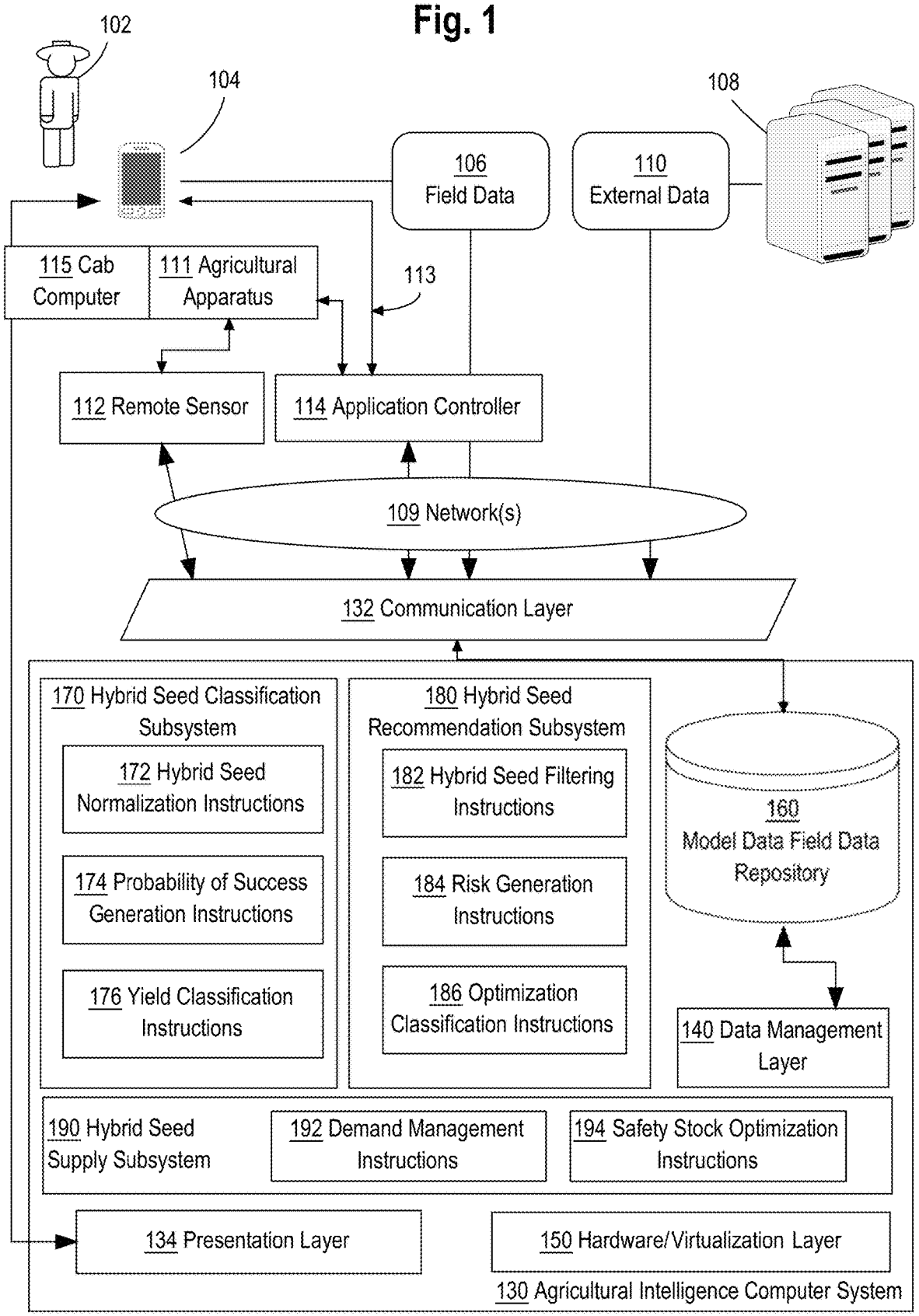
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:
1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. HYBRID SEED CLASSIFICATION SUBSYSTEM
   2.6. HYBRID SEED RECOMMENDATION SUBSYSTEM
   2.7. HYBRID SEED SUPPLY SUBSYSTEM
   2.8 IMPLEMENTATION EXAMPLE—HARDWARE OVERVIEW
3. FUNCTIONAL OVERVIEW—GENERATE AND DISPLAY TARGET SUCCESS YIELD GROUP OF HYBRID SEEDS
   3.1. DATA INPUT
   3.2. AGRICULTURAL DATA PROCESSING
   3.3. PRESENT TARGET SUCCESS YIELD GROUP
4. FUNCTIONAL OVERVIEW—GENERATE AND DISPLAY TARGET HYBRID SEEDS FOR PLANTING
   4.1. DATA INPUT
   4.2. HYBRID SEED SELECTION
   4.3. GENERATE RISK VALUES FOR HYBRID SEEDS
   4.4. GENERATE DATASET OF TARGET HYBRID SEEDS
   4.5. SEED PORTFOLIO ANALYSIS
   4.6. PRESENT SET OF TARGET HYBRID SEEDS
5. FUNCTIONAL OVERVIEW—DETERMINE SUPPLY BASED ON SEED PLACEMENT PRESCRIPTION
   5.1 DEMAND FULFILLMENT THROUGH SUPPLY CHAIN
   5.2 SAFETY STOCK OPTIMIZATION
   5.3 EXAMPLE PROCESSES
6. EXTENSIONS AND ALTERNATIVES
1. General Overview A computer system and a computer-implemented method are disclosed herein for managing hybrid seed supply based on hybrid seed placement prescriptions. In an embodiment, the computer system is programmed to initially determine prescriptions of hybrid seeds for one or more target fields, which may help determine what growers of the one or more target fields will plant in the next growing season. More specifically, the computer system is programmed to initially select some hybrid seeds given probabilities of successful yields associated with hybrid seeds. The computer system is programmed to next estimate yields for the initially selected hybrid seeds and associated risks given historical agricultural data associated with the initially selected hybrid seeds. The computer system is programmed to finally select certain hybrid seeds from the initially selected hybrid seeds given the estimated yields, the associated risks, and properties of the one or more target fields. Alternatively, the computer system is programmed to initially compute yield values and environmental classifications for certain hybrid seeds to be planted at a certain location having one or more target fields given yield properties of the certain hybrid seeds planted at another location. The computer system is programmed to next generate probabilities of successful yields at the certain location for the hybrid seeds given the computed yields values and environmental classifications for the certain hybrid seeds. The computer system is programmed to finally select some hybrid seeds from the certain hybrid seeds given the probabilities of successful yields for the certain hybrid seeds.

In some embodiments, the computer system is programmed to manage supply of hybrid seeds given the prescriptions of the hybrid seed placements. One general assumption is that growers tend to follow the prescriptions, and thus the prescribed hybrid seed volumes may be highly correlated to actual demands for the hybrid seeds. Besides uncertainties associated with the grower fields, additional uncertainties in actual demands may be introduced by various factors, such as the economy, the road conditions, or the operations of distribution facilities. The computer system is programmed to estimate safety stock that will assist a production site in meeting the actual demands. The deviations from prescribed hybrid seed placements may be captured from fluctuations in actual demands across multiple supply management periods or can be specifically modeled after the various potential risk factors.

The computer system provides many technical benefits. Supply management can be challenging, especially as the size and structural complexity of the supply chain increases. By utilizing the prescriptions of hybrid seed placements, the computer system has a solid basis for estimating actual demands. The automatic estimates obviate the need to solicit information regarding planting strategies from the grower computers or other computational components of the supply chain, thus reducing computer network traffic. The accurate estimates avoid the need of repeatedly modifying predictions of actual demands and communicating such to grower computers, thus reducing utilization of computational resources and further reducing computer network traffic. The accurate estimates also increase efficiency of supply management. By optimizing safety stock with respect to the supply chain, the computer system is able to handle various uncertainties and risks and help further increases the efficiency of supply management.

2. Example Agricultural Intelligence Computer System 2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, California, is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
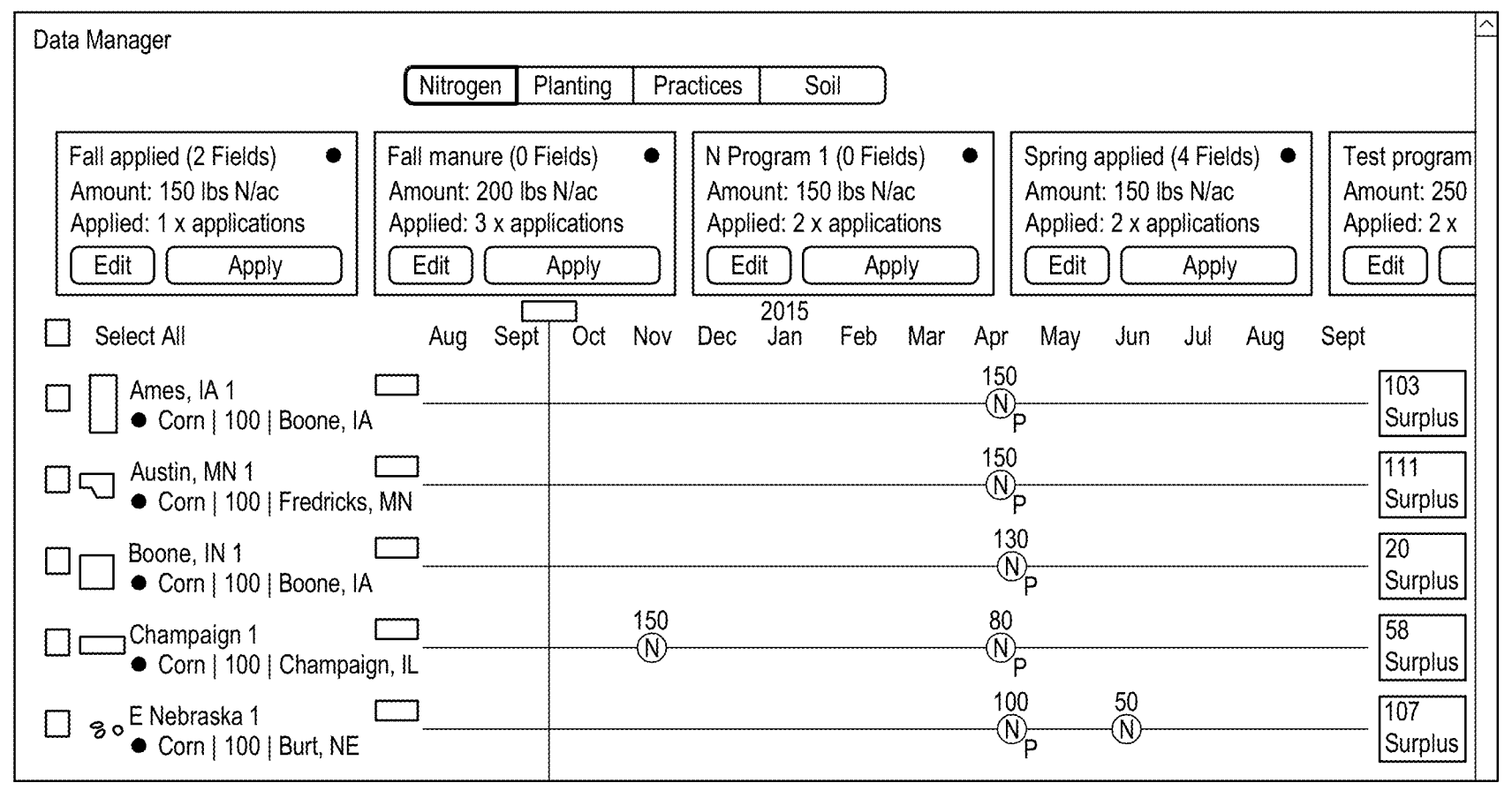

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs. N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs. N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field.

While the nitrogen application in early April may remain, updates to the "Spring applied" program would not alter the April application of nitrogen.

FIG. 6 depicts an example embodiment of a spreadsheet view for data entry.

Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, a hybrid seed classification subsystem 170 contains specially configured logic, including, but not limited to, hybrid seed normalization instructions 172, probability of success generation instructions 174, and yield classification instructions 176, and comprises a set of one or more pages of main memory, such as RAM, in the agricultural intelligence computer system 130 into which executable instructions have been loaded and which when executed cause the agricultural intelligence computing system to perform the functions or operations that are described herein with reference to those modules. For example, the hybrid seed normalization instructions 172 may comprise a set of pages in RAM that contain instructions which when executed cause performing the target identification functions that are described herein. In an embodiment, a hybrid seed recommendation subsystem 180 contains specially configured logic, including, but not limited to, hybrid seed filtering instructions 182, risk generation instructions 184, and optimization classification instructions 186, and comprises a set of one or more pages of main memory, such as RAM, in the agricultural intelligence computer system 130 into which executable instructions have been loaded and which when executed cause the agricultural intelligence computing system to perform the functions or operations that are described herein with reference to those modules. In an embodiment, a hybrid seed supply subsystem 190 contains specially configured logic, including, but not limited to, demand management instructions 192 and safety stock optimization instructions 194, and comprises a set of one or more pages of main memory, such as RAM, in the agricultural intelligence computer system 130 into which executable instructions have been loaded and which when executed cause the agricultural intelligence computing system to perform the functions or operations that are described herein with reference to those modules. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of hybrid seed normalization instructions 172, probability of success generation instructions 174, yield classification instructions 176, hybrid seed filtering instructions 182, risk generation instructions 184, optimization classification instructions 186, demand management instructions 192, and safety stock optimization instructions 194 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computing system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Figure 4:
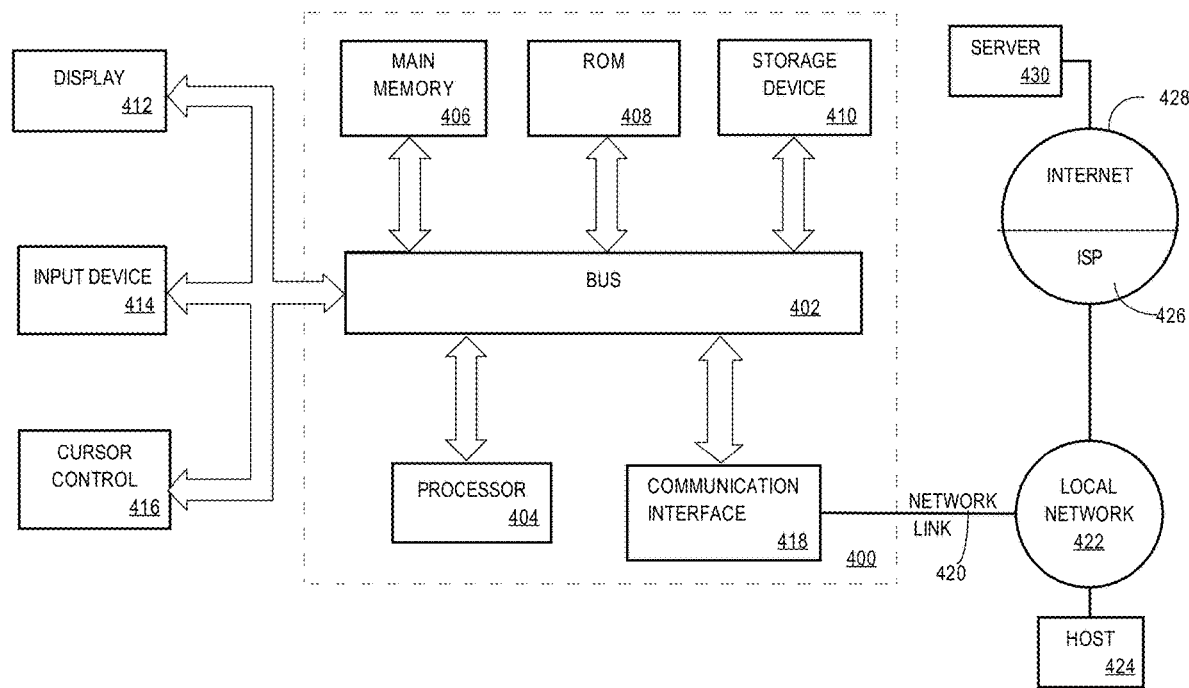
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, California. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, California, may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4. Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
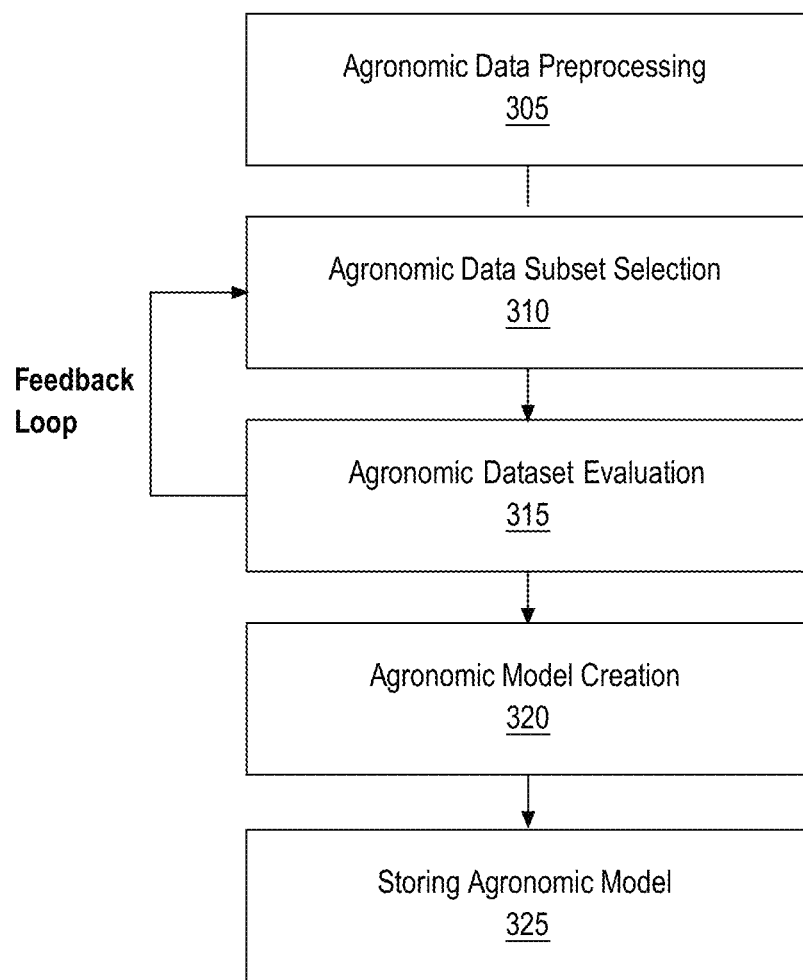
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models' method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Hybrid Seed Classification Subsystem

In an embodiment, the agricultural intelligence computer system 130, among other components, includes the hybrid seed classification subsystem 170. The hybrid seed classification subsystem 170 is configured to generate a target success yield group of hybrid seeds specifically identified for optimal performance on target fields. As used herein the term "optimal" and related terms (e.g., "optimizing", "optimization", etc.) are broad terms that refer to the "best or most effective" with respect to any outcome, system, data etc. ("universal optimization") as well as improvements that are "better or more effective ("relative optimization"). The target success yield group includes a subset of one or more hybrid seeds, an estimated yield forecast for each hybrid seed, and a probability of success of exceeding the average estimated yield forecast for similarly classified hybrid seeds.

In an embodiment, identifying hybrid seeds that will optimally perform on target fields is based on input received by the agricultural intelligence computer system 130 including, but not limited to, agricultural data records for multiple different hybrid seeds and geo-location data related to the fields where the agricultural data records were collected. For example, if agricultural data records are received for one-hundred hybrid seeds, then the agricultural data records would include growth and yield data for the one-hundred hybrid seeds and geo-location data about the fields where the one-hundred hybrid seeds were planted. In an embodiment, the agricultural intelligence computer system 130 also receives geo-location and agricultural data for a second set of fields. The second set of fields are the target fields where the grower intends to plant selected hybrid seeds. Information about the target fields are particularly relevant for matching specific hybrid seeds to the environment of the target fields.

The hybrid seed normalization instructions 172 provide instructions to generate a dataset of hybrid seed properties that describe representative yield values and environmental classifications that preferred environmental conditions for each of the hybrid seeds received by the agricultural intelligence computer system 130. The probability of success generation instructions 174 provide instructions to generate a dataset of success probability scores associated with each of the hybrid seeds. The success probability scores describe the probability of a successful yield on the target fields. The yield classification instructions 176 provide instructions to generate a target success yield group of hybrid seeds that have been identified for optimal performance on target fields based on the success probability scores associated with each of the hybrid seeds.

In an embodiment, the agricultural intelligence computer system 130 is configured to present, via the presentation layer 134, the target success yield group of selected hybrid seeds and their normalized yield values and success probability scores.

Hybrid seed classification subsystem 170 and related instructions are additionally described elsewhere herein.

2.6. Hybrid Seed Recommendation Subsystem

In an embodiment, the agricultural intelligence computer system 130, among other components, includes the hybrid seed recommendation subsystem 180. The hybrid seed recommendation subsystem 180 is configured to generate a set of target hybrid seeds specifically selected for optimal performance on target fields with minimized risk. The set of target hybrid seeds includes a subset of one or more hybrid seeds that have estimated yield forecasts above a specific yield threshold and have an associated risk value that is below a specific risk target.

In an embodiment, identifying a set of target hybrid seeds that will optimally perform on target fields is based on an input set of hybrid seeds that have been identified as having a specific probability of producing a successful yield on the target fields. The agricultural intelligence computer system 130 may be configured to receive a set of hybrid seeds as part of a target success yield group generated by the hybrid seed classification subsystem 170. The target success yield group may also include agricultural data specifying the probability of success for each hybrid seed and other agricultural data such as yield value, relative maturity, and environmental observations from previously observed harvests. In an embodiment, the agricultural intelligence computer system 130 also receives geo-location and agricultural data for a set of target fields. The "target fields" are fields where the grower is considering or intends to plant target hybrid seeds.

The hybrid seed filtering instructions 182 provide instructions to filter and identify a subset of hybrid seeds that have a probability of success value that is above a specified success yield threshold. The risk generation instructions 184 provide instructions to generate a dataset of risk values associated with each of the hybrid seeds. The risk values describe the amount of risk associated with each hybrid seed with respect to the estimated yield value for each hybrid seed. The optimization classification instructions 186 provide instructions to generate a dataset of target hybrid seeds that have average yield values above a target threshold for a range of risk values from the dataset of risk values.

In an embodiment, the agricultural intelligence computer system 130 is configured to present, via the presentation layer 134, the set of target hybrid seeds and including their average yield values.

Hybrid seed recommendation subsystem 180 and related instructions are additionally described elsewhere herein.

2.7. Hybrid Seed Supply Subsystem

In an embodiment, the agricultural intelligence computer system 130, among other components, includes the hybrid seed supply subsystem 190. The hybrid seed supply subsystem 190 is configured to estimate actual demands and determine appropriate supply to meet the actual demands despite various uncertainties and risks.

In some embodiments, the hybrid seed supply subsystem 190 is programmed or configured to receive prescriptions of hybrid seed placements from the hybrid seed recommendation subsystem 180. The demand management instructions 192 provide instructions to estimate aggregate demand in a certain period for each hybrid seed with respect to a supply chain. Such estimation may be based on the prescriptions of hybrid seed placements. The safety stock optimization instructions 194 provide instructions to determine optimal safety stock for one or more production sites to meet the aggregate demand considering possible risks.

In an embodiment, the agricultural intelligence computer system 130 is configured to present, via the presentation layer 134, the values of optimal safety stock to other devices associated with the production of hybrid seeds.

Hybrid seed supply subsystem 190 and related instructions are additionally described elsewhere herein.

2.8 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Functional Overview—Generate and Display Target Success Yield Group of Hybrid Seeds FIG. 7 depicts a detailed example of generating a target success yield group of hybrid seeds identified for optimal yield performance on target fields based on agricultural data records of the hybrid seeds and geo-location data associated with the target fields.

3.1. Data Input

At step 705, the agricultural intelligence computer system 130 receives agricultural data records from one or more fields for multiple different hybrid seeds. In an embodiment, the agricultural data records may include crop seed data for one or more hybrid seeds. Crop seed data can include historical agricultural data related to the planting, growing, and harvesting of specific hybrid seeds on one or more fields. Examples of crop seed data may include, but are not limited to, historical yield values, harvest time information, and relative maturity of a hybrid seed, and any other observation data about the plant life cycle. For example, the agricultural data records may include hybrid seed data for two hundred (or more) different types of available corn hybrids. The crop seed data associated with each of the corn hybrids would include historical yield values associated with observed harvests, harvest time information relative to planting, and observed relative maturity for each of the corn hybrids on each of the observed fields. For instance, corn hybrid-001 may have agricultural data records that include historical yield data collected from twenty (or more) different fields over the past ten (or more) years.

In an embodiment, the agricultural data records may include field specific data related to the fields where the crop seed data was observed. For example, field specific data may include, but is not limited to, geo-location information, observed relative maturity based on field geo-location, historical weather index data, observed soil properties, observed soil moisture and water levels, and any other environmental observations that may be specific to the fields where historical crop seed data is collected. Field specific data may be used to further quantify and classify crop seed data as it relates to each of the hybrid seeds. For example, different fields in different geo-locations may be better suited for different hybrid seeds based on relative maturity of the hybrid seeds and the length of the growing season. Fields within specific regions and sub-regions may have an assigned relative maturity for the growing season that is based on the climate associated with the specific geo-location and the amount of growing degree days (GDDs) available during the growing season.

Figure 8:
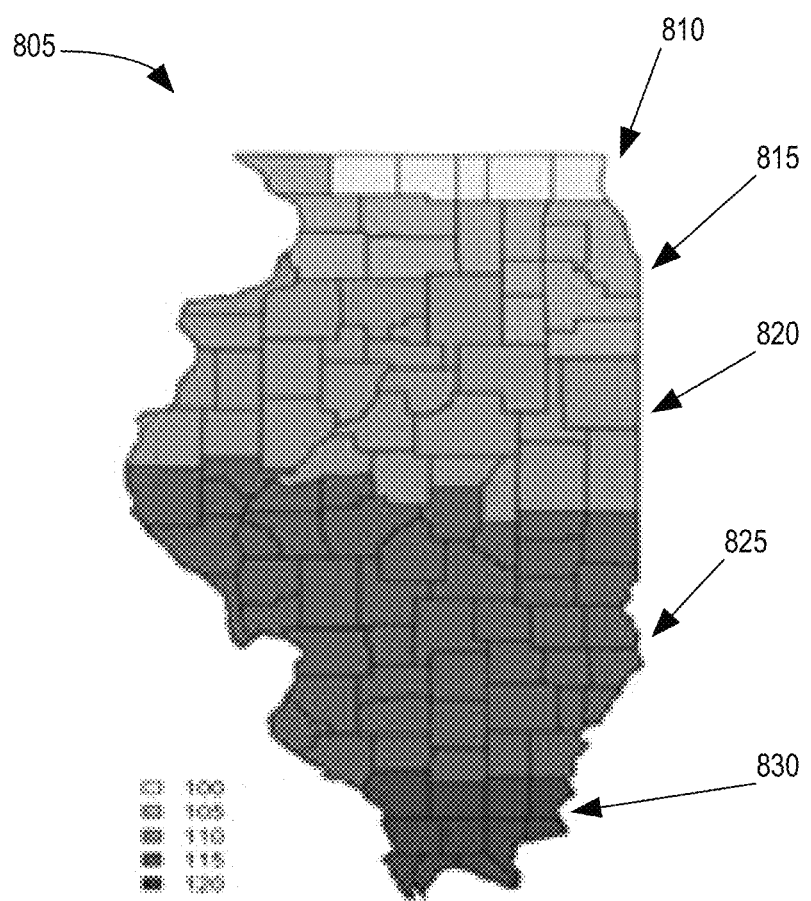
FIG. 8 depicts an example of different regions within a state that have different assigned relative maturity based on the growing season durations.

FIG. 8 depicts an example of different regions within a state that have different assigned relative maturity based on the growing season durations. State 805 is the state of Illinois and is divided into multiple different regions and sub-regions. Examples of sub-regions may include areas based on county, city, or town boundaries. Each of regions 810, 815, 820, 825, and 830 represent geo-location specific regions that have different growing season durations. For example, region 810 represents a region of fields that based upon their geo-locations and the associated climate have a shorter growing season because of cooler climates. As a result, region 810 may be classified as fields that are suited for hybrid seeds with a relative maturity of 100 days (shown as a legend of shades and respective GDD in FIG. 8). Region 815 is located south of region 100 and as a result may have warmer overall climates. Fields in region 815 may be classified as fields suited for hybrid seeds with a relative maturity of 105 days. Similarly, regions 820, 825, and 830 are located further south than regions 810 and 815, and as a result are classified with relative maturity classifications of 110, 115, and 120 days respectively. Relative maturity classifications for different regions may be used with historical yield data for hybrid seeds to assess how well hybrid seeds perform on fields based on rated relative maturities.

In an embodiment, specific field data within the agricultural data records may also include crop rotation data. Soil nutrient management for fields may depend on factors such as establishing diverse crop rotations and managing the amount of tillage of the soil. For example, some historical observations have shown that a "rotation effect" of rotating between different crops on a field may increase crop yield by 5 to 15% over planting the same crop year over year. As a result, crop rotation data within the agricultural data records may be used to help determine a more accurate yield estimation.

In an embodiment, specific field data may include tillage data and management practices used during the crop season. Tillage data and management practices refer to the manner and schedule of tillage performed on a particular field. Soil quality and the amount of useful nutrients in the soil varies based upon the amount of topsoil. Soil erosion refers to the removal of topsoil, which is the richest layer of soil in both organic matter and nutrient value. One such practice that causes soil erosion is tillage. Tillage breaks down soil aggregates and increases soil aeration, which may accelerate organic matter decomposition. Therefore, tracking tillage management practices may account for understanding the amount of soil erosion that occurs which may affect the overall yield of planted crop.

In an embodiment, the agricultural data records include historical crop seed data and field specific data from a set of test fields used to determine hybrid seed properties by manufacturers. For example, Monsanto Corporation produces several commercial hybrid seeds and tests their crop growth on multiple test fields. Monsanto Corp.'s test fields may serve as an example of a set of test fields where agricultural data records are collected and received by the agricultural intelligence computer system 130. In another embodiment, the agricultural data records may include historical crop seed data and field specific data from sets of fields owned and operated by individual growers. These sets of fields where agricultural data records are collected may also be the same fields designated as target fields for planting newly selected crops. In yet other embodiments, sets of fields owned and operated by a grower may provide agricultural data records used by other growers when determining the target success yield group of hybrid seeds.

Referring back to FIG. 7, at step 710, the agricultural intelligence computer system 130 receives geo-location information for one or more target fields. Target fields represent the fields where the grower is considering planting or planning to plant the set of hybrid seeds selected from the target success yield group. In an embodiment, the geo-location information for the one or more target fields may be used in conjunction with the agricultural data records of specific fields to determine which hybrid seeds, based on relative maturity and climate are best suited for the target fields.

3.2. Agricultural Data Processing

At step 715, the hybrid seed normalization instructions 172 provide instruction to generate a dataset of hybrid seed properties that describe representative yield values and environmental classifications for each hybrid seed received as part of the agricultural data records. In an embodiment, the agricultural data records associated with hybrid seeds are used to calculate a representative yield value and an environmental classification for each of the hybrid seeds. The representative yield value is an expected yield value for a specific hybrid seed if planted in a field based on the historical yield values and other agricultural data observed from past harvests.

In an embodiment, the normalized yield value may be calculated by normalizing multiple different yield observations from different fields across different observed growth years. For example, fields where a specific hybrid seed was first planted may be used to calculate an average first-year growth cycle yield for a specific hybrid seed. The average first-year growth cycle yield for the specific hybrid seed may include combining observed yield values from different fields over different years. For instance, the specific hybrid seed may have been planted on fields tested during the product stage of Monsanto's commercial product cycle (PS3, PS4, MD1, and MD2) over a time span of 2009 through 2015. However, the first cycle of the specific hybrid seed may have been planted on each of the fields on different years. The following table illustrates one such example:

|  | 2009 | 2010 | 2011 | 2012 | 2013 | 2014 | 2015 |
|---|---|---|---|---|---|---|---|
| Cycle 1 | PS3 | PS4 | MD1 | MD2 |  |  |  |
| Cycle 2 |  | PS3 | PS4 | MD1 | MD2 |  |  |
| Cycle 3 |  |  | PS3 | PS4 | MD1 | MD2 |  |
| Cycle 4 |  |  |  | PS3 | PS4 | MD1 | MD2 |

The columns of the table represent harvest years and the rows of the table represent Monsanto commercial product development cycles, where cycle 1 represents the 4 years of the hybrid seeds was planted on various fields and cycle 2 represents the second cycle of 4 years for another set of hybrid seeds planted on the same field environments and so on.

In an embodiment, calculating normalized yield values may be based on similar cycles for the hybrid seed planted at the multiple fields. For instance, the normalized yield value for cycle 1 may be calculated as an average of the yield values observed on fields PS3 (2009), PS4 (2010), MD1 (2011), and MD2 (2012). By doing so, yield values may be averaged based upon the common feature of how many growth cycles have occurred on the particular fields. In other embodiments, calculating normalized yield values may be based on other agricultural properties from the agricultural data records such as same year or same region/field.

In an embodiment, the environmental classification for each of the hybrid seeds may be calculated using a relative maturity field property associated agricultural data records of the hybrid seeds. For example, the specific hybrid seed may have been planted across several fields within region 820. Each of the fields within region 820 are classified as having an observed growth season that aligns with the relative maturity of 110 days. Therefore, based the fields associated with the specific hybrid seed, the environmental classification for the specific hybrid seed may be assigned a relative maturity that equals that of the region 820, which is 110 days. In other embodiments, if the fields associated with historical observations of the specific hybrid seed contain fields classified within multiple regions then the environmental classification may be calculated as an average of the different assigned relative maturity values.

In an embodiment, the dataset of hybrid seed properties contains normalized yield values for each hybrid seed and an environmental classification that describes the relative maturity value associated with the normalized yield value. In other embodiments, the dataset of hybrid seed properties may also include properties related to the hybrid seed growth cycle and field properties such as crop rotations, tillage, weather observations, soil composition, and any other agricultural observations.

Referring back to FIG. 7, at step 720 the probability of success generation instructions 174 provide instruction to generate a dataset of success probability scores for each of the hybrid seeds which, describe a probability of a successful yield as a probabilistic value of achieving a successful yield relative to average yields of other hybrid seeds with the same relative maturity. In an embodiment, the success probability scores for the hybrid seeds are based upon the dataset of hybrid seed properties with respect to the geo-locations associated with the target fields. For example, relative maturity values associated with the geo-locations of the target fields are used in part to determine the set of hybrid seeds to evaluate against in order to calculate a success probability score for a particular hybrid seed. For instance, corn hybrid-002 may be a hybrid seed with a normalized yield calculated as 7.5 bushels per acre and an assigned relative maturity of 100 GDD. Corn hybrid-002 is then compared against other hybrid seeds that have similar relative maturity in order to determine whether corn hybrid-002 a good candidate for planting based upon the normalized yield value of corn hybrid-002 and the other hybrid seeds.

Machine learning techniques are implemented to determine probability of success scores for the hybrid seeds at the geo-locations associated with the target fields. In an embodiment, the normalized yield values and assigned relative maturity values are used as predictor variables for machine learning models. In other embodiments, additional hybrid seed properties such as, crop rotations, tillage, weather observations, soil composition, may also be used as additional predictor variables for the machine learning models. The target variable of the machine learning models is a probabilistic value ranging from 0 to 1, where 0 equals a 0% probability of a successful yield and 1 equals a 100% probability of a successful yield. In other embodiments, the target variable may be a probabilistic value that may be scaled from 0 to 10, 1 to 10, or any other scale of measurement. A successful yield is described as the likelihood that the yield of a specific hybrid seed is a certain value above the mean yield for similarly classified hybrid seeds. For example, a successful yield may be defined as a yield that is 5 bushels per acre above the mean yield of hybrid seeds that have the same assigned relative maturity value.

Figure 9:
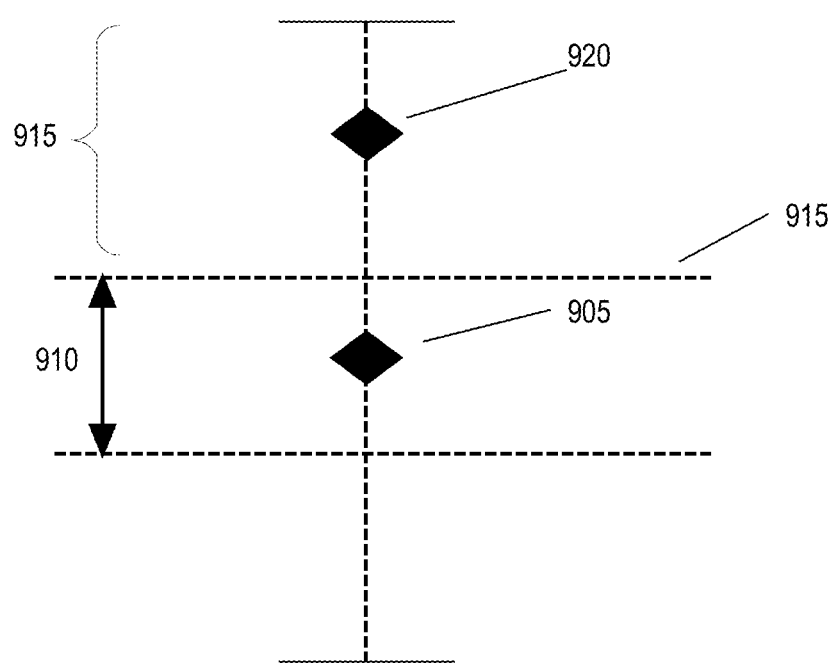
FIG. 9 depicts a graph describing the range of normalized yield values for hybrid seeds within a classified relative maturity.

FIG. 9 depicts a sample graph describing the range of normalized yield values for hybrid seeds within a classified relative maturity. Mean value 905 represents the calculated mean yield value for hybrid seeds that have the same relative maturity, such as 110 GDD. In an embodiment, determining which hybrid seeds have a significant normalized yield above the mean value 905 may be calculated by implementing a least significant difference calculation. The least significant difference is a value at a particular level of statistical probability. If the value is exceeded by the difference between two means, then the two means are said to be distinct. For example, if the difference between yield values of a hybrid seed and the calculated mean yield exceeds the least significant difference value, then the yield for the hybrid seed is seen as distinct. In other embodiments, determining significant differences between yield values and the mean value 905 may be determined using any other statistical algorithm.

Range 910 represents a range of yield values that are considered within the least significant difference value, and therefore are not significantly distinct. Threshold 915 represents the upper limit of the range 910. Normalized yield values above threshold 915 are then considered to be significantly distinct from the mean value 905. In an embodiment, range 910 and threshold 915 may be configured to represent a threshold for determining which hybrid seed yields are considered to be significantly higher than the mean value 905 and therefore a successful yield value. For example, threshold 915 may be configured to equal a value that is 5 bushels per acre above the mean value 905. In an embodiment, threshold 915 may be configured as a yield value that is dependent on the mean value 905, range 910, and the overall range of yield values for the specific hybrid seeds that have the same relative maturity.

Range 920 represents a range of yield values for hybrid seeds that are considered successful yields. Hybrid seed 925 represents a specific hybrid seed within the range 920 that has a normalized yield value above the threshold 915. In an embodiment, machine learning models may be configured to use the range 910 and threshold 915 when calculating probability of success scores between 0 and 1. Different machine learning models may include, but are not limited to, logistic regression, random forest, vector machine modelling, and gradient boost modelling.

In an embodiment, logistic regression may be implemented as the machine learning technique to determine probability of success scores for each of the hybrid seeds for the target fields. For logistic regression, the input values for each hybrid seed are the normalized yield value and the environmental classification, which is specified as relative maturity. The functional form of the logistic regression is:

$$P(y=1|x_1 = \underline{yld_i}, x_2 = \underline{RM_j}) = \frac{e^{a+b*x_1+c*x_2}}{1+e^{a+b*x_1+c*x_2}},$$

$$\text{where } P(y=1|x_1 = \underline{yld_i}, x_2 = \underline{RM_j})$$

is the probability of success (y=1) for product i with normalized yield value and in target field j with a given relative maturity;

constants a, b and c are the regression coefficients estimated through historical data. The output of the logistic regression is a set of probability scores between 0 and 1 for each hybrid seed specifying success at the target field based upon the relative maturity assigned to the geo-location associated with the target fields.

In another embodiment, a random forest algorithm may be implemented as the machine learning technique to determine probability of success scores for each of the hybrid seeds for the target fields. Random forest algorithm is an ensemble machine learning method that operates by constructing multiple decision trees during a training period and then outputs the class that is the mean regression of the individual trees. The input values for each hybrid seed are the normalized yield value and the environmental classification as relative maturity. The output is a set of probability scores for each hybrid seed between 0 and 1.

In another embodiment, support vector machine (SVM) modelling may be implemented as the machine learning technique to determine probability of success scores for each of the hybrid seeds for the target fields. Support vector machine modelling is a supervised learning model used to classify whether input using classification and regression analysis. Input values for the support vector machine model are the normalized yield values and the environmental classification relative maturity values for each hybrid seed. The output is a set of probability scores for each hybrid seed between 0 and 1. In yet another embodiment, gradient boost (GBM) modelling may be implemented as the machine learning technique, where the input values are the normalized yield values and the environmental classification relative maturity values for each hybrid seed. Gradient boost is a technique for regression and classification problems, which produces a prediction model in the form of an ensemble of weak prediction models, such as decision trees.

Referring to FIG. 7, at step 725 the yield classification instructions 176 generate a target success yield group made up of a subset of the hybrid seeds that have been identified as having a high probability to produce a yield that is significantly higher than the average yield for other hybrid seeds within the same relative maturity classification for the target fields. In an embodiment, the target success yield group contains hybrid seeds that have probability of success values that are above a specific success probability threshold. The success probability threshold may be configured probability value that is associated with yields that are significantly higher than the mean yield of other hybrid seeds. For example, if at step 720 the yield threshold for successful yields is equal to five bushels per acre above the mean value, then the success probability threshold may be associated with a probability of success value equal to that of the yield threshold. For instance, if the yield threshold equals five bushels per acre above the mean yield and has a probability of success value as 0.80 then the success probability threshold may be assigned 0.80. In this example, the target success yield group would contain hybrid seeds that have probability of success values equal to or greater than 0.80.

In other embodiments, the success probability threshold may be configured to be higher or lower depending on whether the grower desires a smaller or larger target success yield group respectively.

3.3. Present Target Success Yield Group

In an embodiment, the target success yield group contains hybrid seeds that have an assigned relative maturity value that equals the relative maturity associated with the target fields. At step 730, the presentation layer 134 of the agricultural intelligence computer system 130 is configured to display or cause display, on a display device on the field manager computing device 104, of the target success yield group and normalized yield values for each hybrid seed within the target success yield group. In another embodiment, the presentation layer 134 may communicate the display of the target success yield group to any other display devices that may be communicatively coupled to the agricultural intelligence computer system 130, such as remote computer devices, display devices within a cab, or any other connected mobile devices. In yet another embodiment, the presentation layer 134 may communicate the target success yield group to other systems and subsystems with the agricultural intelligence computer system 130 for further processing and presentation.

In an embodiment, the presentation layer 134 may display additional hybrid seed property data and other agricultural data that may be relevant to the grower. The presentation layer 134 may also sort the hybrid seed in the target success yield group based on the probability of success values. For example, the display of hybrid seeds may be sorted in descending order of probability of success values such that the grower is able to view the most successful hybrid seeds for his target fields first.

In some embodiments, the after receiving the information displayed, a grower may act on the information and plant the suggested hybrid seeds. In some embodiments, the growers may operate as part of the organization that is determining the target success yield group, and/or may be separate. For example, the growers may be clients of the organization determining the target success yield group and may plant seed based on the target success yield group.

Figure 10:
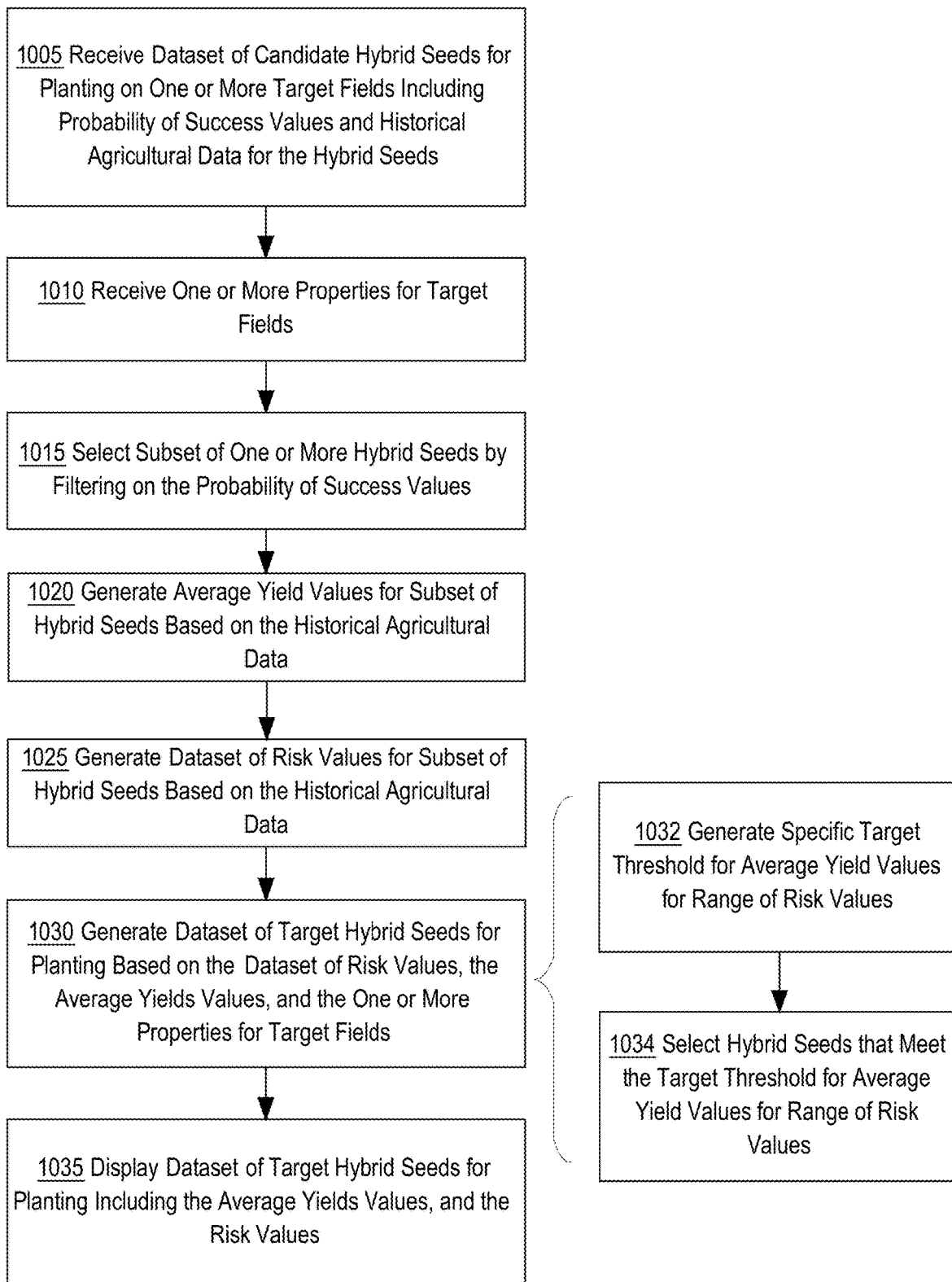
FIG. 10 depicts an example flowchart for generating a set of target hybrid seeds identified for optimal yield performance and managed risk on target fields based on agricultural data records of the hybrid seeds and geo-location data associated with the target fields

4. Functional Overview—Generating and Displaying Target Hybrid Seeds for Planting FIG. 10 depicts a detailed example of generating a set of target hybrid seeds identified for optimal yield performance and managed risk on target fields based on agricultural data records of the hybrid seeds and geo-location data associated with the target fields.

4.1. Data Input

At step 1005, the agricultural intelligence computer system 130 receives a dataset of candidate hybrid seeds including one or more hybrid seeds suited for planting on target fields, probability of success values associated with each hybrid seed, and historical agricultural data associated with each hybrid seed. In an embodiment, the dataset of candidate hybrid seeds may include a set of one or more hybrid seeds identified by the hybrid seed classification subsystem 170 as having a high probability to produce successful yield values on the target fields and historical agricultural data associated with each hybrid seed in the set of candidate hybrid seeds. The target success yield group generated at step 725 in FIG. 7 may represent the dataset of candidate hybrid seeds.

In an embodiment, the historical agricultural data may include agricultural data related to the planting, growing, and harvesting of specific hybrid seeds on one or more fields. Examples of agricultural data may include, but are not limited to, historical yield values, harvest time information, and relative maturity of a hybrid seed, and any other observation data about the plant lifecycle. For example, if the dataset of candidate hybrid seeds is the target success yield group from the hybrid seed classification subsystem 170, then the agricultural data may include an average yield value and a relative maturity assigned to each hybrid seed.

At step 1010, the agricultural intelligence computer system 130 receives data about the target fields where the grower is planning to plant the set of target hybrid seeds. In an embodiment, the data about the target fields is property information that includes, but is not limited to, geo-location information for the target fields and dimension and size information for each of the target fields. In an embodiment, the geo-location information for the target fields may be used in conjunction with the historical agricultural data to determine optimal set of target hybrid seeds and amount of each of the target hybrid seeds to plant on each of the target fields based on relative maturity and climate of the target fields.

4.2. Hybrid Seed Selection

At step 1015, the hybrid seed filtering instructions 182 provide instruction to select a subset of one or more hybrid seeds from the candidate set of hybrid seeds that have a probability of success value greater than or equal to a target probability filtering threshold. In an embodiment, the target probability filtering threshold is a configured threshold of the probability of success value associated with each of the hybrid seeds in the candidate set of hybrid seeds. The target probability filtering threshold may be used to further narrow the selection pool of hybrid seeds based upon only selecting the hybrid seeds that have a certain probability of success. In an embodiment, if the candidate set of hybrid seeds represents the target success yield group generated at step 725, then it is likely that the set of hybrid seeds have already been filtered to only include hybrid seeds with a high probability of success value. In one example, the target probability filtering threshold may have the same threshold value as the successful yield threshold used to generate the target success yield group. If that is the case, then the subset of one or more hybrid seeds may include the entire set of hybrid seeds. In another example, the grower may desire a more narrowed list of hybrid seeds, which may be achieved by configuring a higher probability of success value for the target probability filtering threshold to filter out the hybrid seeds that have lower than desired probability of success values.

At step 1020, the seed normalization instructions 172 provide instruction to generate a representative yield value for each hybrid seed in the subset of one or more hybrid seeds based on yield values from the historical agricultural data for each of the hybrid seeds. In an embodiment, representative yield value is an expected yield value for a specific hybrid seed if planted in a field based on the historical yield values and other agricultural data observed from past harvests. In an embodiment, the representative yield value is a calculated average of yields from multiple different observed growth seasons on multiple fields. For example, the representative yield value may be calculated as an average of different observed growth cycle years, where an average first-year growth cycle yield for the specific hybrid seed may incorporate combining observed yield values from different fields over different years. After calculating average growth cycle yields for different growth cycle years, each of the averages may be combined to generate a representative average yield for each specific hybrid seed. In another embodiment, the representative yield value may be the normalized yield value calculated at step 715.

4.3. Generate Risk Values for Hybrid Seeds

At step 1025, the risk generation instructions 184 provide instruction to generate a dataset of risk values for each hybrid seed in the subset of one or more hybrid seeds based upon historical agricultural data associated with each of the hybrid seeds. Risk values describe the amount of risk, in terms of yield variability, for each hybrid seed based upon the representative yield value. For example, if for corn hybrid-002 the representative yield is fifteen bushels per acre however, the variability for corn hybrid-002 is high such that the yield may range from five bushels per acre to twenty-five bushels per acre, then it is likely that the representative yield for corn hybrid-002 is not a good representation of actual yield because the yield may vary between five and twenty-five bushels per acre. High risk values are associated with high variability on yield return, whereas low risk values are associated with low variability on yield return and yield outcomes that are more closely aligned to the representative yield.

In an embodiment, risk values for hybrid seeds are based on the variability between year-to-year yield returns for a specific hybrid seed over two or more years. For example, calculating a risk value for corn hybrid-002 includes calculating the variability of yield values from multiple years of yield output from the historical agricultural data. The variance in yield output from 2015 and 2016 for corn hybrid-002 may be used to determine a risk value that may be associated with the representative yield value for corn hybrid-002. Determining the variance of yield output is not limited to using yield output from two previous years, variance may be calculated with yield output data from multiple years. In an embodiment, the calculated risk values may be represented in terms of a standard deviation of bushel per acre, where standard deviation is calculated as the square root of the calculated variance of risk.

In an embodiment, risk values for hybrid seeds may be based on the variability of yield output from field-to-field observations for a specific year. For example, calculating a risk value associated with field variability may include determining the variability of yields from each field observed for a specific hybrid seed for a specific year. If for a specific hybrid seed the observed yield output across multiple fields ranges from five to fifty bushels per acre, then the specific hybrid seed may have high field variability. As a result, the specific hybrid seed may be assigned a high-risk factor based on field variability because expected output on any given field may vary between five to fifty bushels per acre instead of being closer to the representative yield value.

In another embodiment, risk values for hybrid seeds may be based upon variability between year-to-year yield returns and variability between field-to-field observations. Both the year-to-year risk values and the field-to-field risk values may be combined to represent a risk value that incorporates variability of yield output across multiple observed fields and multiple observed seasons. In yet other embodiments, risk values may incorporate other observed crop seed data associated with historical crop growth and yield.

4.4. Generate Dataset of Target Hybrid Seeds

At step 1030, the optimization classification instructions 186 provide instruction to generate a dataset of target hybrid seeds for planting on the target fields based on the dataset of risk values, the representative yield values for the hybrid seeds, and the one or more properties for the target fields. In an embodiment, the target hybrid seeds in the dataset of target hybrid seeds are selected based upon their representative yield values and the associated risk values from the dataset of risk values.

Determining which combination of hybrid seeds to include in the dataset of target hybrid seeds involves determining a relationship between the representative yield for a specific hybrid seed and the risk value associated with the specific hybrid seed. Choosing hybrid seeds that have high representative yields may not result in an optimal set of hybrid seeds if the high yield hybrid seeds also carry a high level of risk. Conversely, choosing hybrid seeds that have low risk values may not have a high enough yield return on investment.

Figure 11:
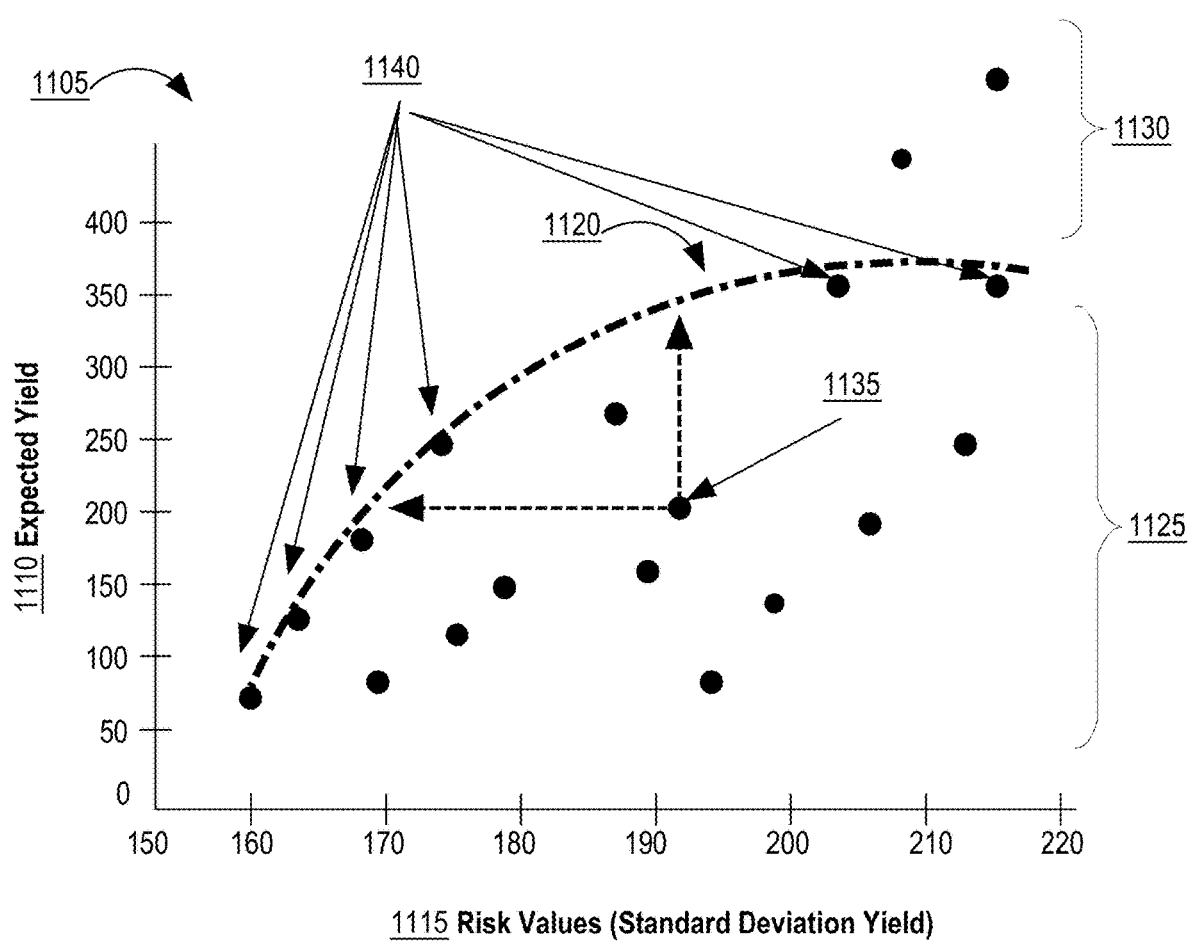
FIG. 11 depicts an example graph of yield values versus risk values for one or more hybrid seeds.

In an embodiment, the hybrid seeds from the subset of one or more hybrid seeds may be graphed based on their respective representative yield values versus their associated risk values. FIG. 11 depicts an example graph 1105 of yield versus risk for the subset of one or more hybrid seeds. The y-axis 1110 represents the representative yield, as expected yield, for the hybrid seeds and the x-axis 1115 represents the risk values for the hybrid seeds expressed as standard deviation. By representing risk values as standard deviation, the unit of the risk values may be the same as the units for representative yield, which is bushels per acre. Dots on graph 1105, represented by group 1125 and group 1130 represent each of the hybrid seeds from the subset of one or more hybrid seeds. For example, graph 1105 shows that hybrid seed 1135 has a representative yield value two hundred bushels per acre and a risk value having a standard deviation of one hundred ninety-one bushels per acre. In other embodiments, graph 1105 may be generated using different units such as profit per acre measured in dollars or any other derived unit of measurement.

In an embodiment, determining which hybrid seeds belong in the dataset of target hybrid seeds involves determining an expected yield return for a specified amount of risk. To generate set of target hybrid seeds that will likely be resilient to various environmental and other factors, it is preferable to generate a diverse set of hybrid seeds that contains hybrid seeds with both lower and higher risk values as well as moderate to high yield output. Referring to FIG. 10, step 1032 represents generating a target threshold of representative yield values for a range of risk values. In an embodiment, the optimization classification instructions 186 provide instruction to calculate an optimal frontier curve that represents a threshold of optimal yield output with a manageable amount of risk tolerance over the range of risk values. A frontier curve is a fitted curve that represents the optimal output with respect to the graphed input values considering optimal efficiency. For example, graph 1105 contains hybrid seeds based on representative yield versus risk value, where it may be inferred that a specific hybrid seed that has a higher yield is likely to also have higher risk. Conversely, hybrid seeds that have lower risk values are likely to have lower representative yield values. Frontier curve 1120 represents an optimal curve that tracks the optimal amount of yield based on a range of risk values.

At step 1034, the optimization classification instructions 186 provide instruction to select hybrid seeds that make up the set of target hybrid seeds by selecting the hybrid seeds that have a representative yield and risk value that meets the threshold defined by the frontier curve 1120. Hybrid seeds that fall on or near the frontier curve 1120 provide the optimal level of yield at the desired level of risk. Target hybrid seeds 1140 represent the optimal set of hybrid seeds for the dataset of target hybrid seeds. Hybrid seeds that fall under the frontier curve 1120 have sub-optimal yield output for the level of risk or have higher than desired risk for the level of yield output produced. For example, hybrid seed 1135 is under the frontier curve 1120 and may be interpreted as having lower than optimal yield for its amount of risk, as shown by the placement of hybrid seed 1135 being vertically below the frontier curve 1120. Also, hybrid seed 1135 may be interpreted as having higher than expected risk for its yield output, as shown by the placement of hybrid seed 1135 being horizontally to the right of the frontier curve 1120 for that amount of representative yield. Hybrid seeds 1135 that are not on or near the frontier curve 1120 have sub-optimal representative yield for their associated risk values and are therefore not included in the set of target hybrid seeds. Additionally, hybrid seeds 1135 represent hybrid seeds that have a higher than desired risk value and are therefore not included in the set of target hybrid seeds.

In an embodiment, the optimization classification instructions 186 provide instruction to generate allocation instructions for each target hybrid seed in the set of target hybrid seeds. Allocation instructions describe an allocation quantity of seeds for each target hybrid seed in the set of target hybrid seeds that provide an optimal allocation strategy to a grower based upon the amount and location of the target fields. For example, allocation instructions for a set of target hybrid seeds that includes seeds (CN-001, CN-002, SOY-005, CN-023) may include an allocation of 75% of CN-001, 10% of CN-002, 13% of SOY-005, and 2% of CN-023. Embodiments of the allocation instructions may include, but are not limited to, number of bags of seeds, a percentage of the total seeds to be planted across the target fields, or an allotment number of acres for each target hybrid seed to be planted. In an embodiment, determining allocation amounts may be calculated using a third-party optimization solver product, such as CPLEX Optimizer by IBM. The CPLEX Optimizer is a mathematical programming solver for linear programming, mixed integer programming, and quadratic programming. Optimization solvers, such as CPLEX Optimizer, are configured to evaluate the representative yield values and risk values associated with the target hybrid seeds and determine a set of allocation instructions for allocating amounts of seeds for each of the target hybrid seeds in the set of target hybrid seeds. In an embodiment, the optimization solver may use the sum of the representative yield values of target hybrid seeds and a calculated sum of risk values of the target hybrid seeds to calculate a configured total risk threshold that may be used to determine the upper limits of allowed risk and yield output for the set of target hybrid seeds.

In another embodiment, the optimization solver may also input target field data describing size, shape, and geo-location of each of the target fields, in order to determine allocation instructions that include placement instructions for each of the allotments of target hybrid seeds. For example, if a particular target field is shaped or sized in a particular way, the optimization solver may determine that allotment of one target hybrid seed is preferable on the particular field as opposed to planting multiple target hybrid seeds on the particular field. The optimization solver is not limited to the CPLEX Optimizer, other embodiments may implement other optimization solvers or other optimization algorithms to determine sets of allocation instructions for the set of target hybrid seeds.

4.5. Seed Portfolio Analysis

Step 1030 described determining and generating the set of target hybrid seeds for a grower based on the target fields using the frontier curve to determine the optimal yield output for the desired level of risks. In an embodiment, the optimization classification instructions 186 provide instruction to configure the frontier curve to determine overall optimal performance for a grower's seed portfolio relative to other growers within the same region or sub-region. For example, representative yield output and overall risk values may be calculated for each grower within a specific region. For example, using historical agricultural data for multiple growers, the representative yield values and associated risk values for hybrid seeds planted by each grower may be aggregated to generate an aggregated yield output value and aggregated risk value associated with each grower. Then the aggregated values for each grower may be graphed on a seed portfolio graph, similar to graph 1105, where the individual dots on the graph may represent a grower's aggregated hybrid seed yield output and aggregated risk. In an embodiment, the frontier curve may be generated to determine an optimal aggregated yield output and aggregated risk value for the growers in the specific region. Growers that are on or near the frontier curve may represent growers whose seed portfolio produces the optimal amount of yield with a managed amount of risk. Growers that are below the frontier curve represent growers that are not maximizing their output based on their risk.

In an embodiment, the optimization classification instructions 186 provide instruction to generate an alert message for a particular grower if the aggregated yield output and aggregated risk for the grower's seed portfolio does not meet the optimal threshold for the seed portfolio as described by the frontier curve on a seed portfolio graph. The presentation layer 134 may be configured to present and send the alert message to the field manager computing device 104 for the grower. The grower may then have the option of requesting a set of target hybrid seeds that may provide optimal yield output for future growing seasons.

4.6. Present Set of Target Hybrid Seeds

In an embodiment, the dataset of target hybrid seeds may contain the representative yield values and risk values, from the dataset of risk values, associated with each target hybrid seed in the dataset of target hybrid seeds for the target fields. Referring to FIG. 10, at step 1035 the presentation layer 134 of the agricultural intelligence computer system 130 is configured to communicate a display, on a display device on the field manager computing device 104, of the dataset of target hybrid seeds including the representative yield values and associated risk values for each target hybrid seed. In another embodiment, the presentation layer 134 may communicate the display of the dataset of target hybrid seeds to any other display devices that may be communicatively coupled to the agricultural intelligence computer system 130, such as remote computer devices, display devices within a cab, or any other connected mobile devices. In yet another embodiment, the presentation layer 134 may communicate the dataset of target hybrid seeds to other systems and subsystems with the agricultural intelligence computer system 130 for further processing and presentation.

In an embodiment, the presentation layer 134 may display allocation instructions, including seed allotments and placement information, for each target hybrid seed. The presentation layer 134 may also sort the target hybrid seeds based on allotment quantity or may present the target hybrid seeds based on placement strategy on the target fields. For example, the display of target hybrid seeds and allocation instructions may be superimposed onto a map of the target fields so that the grower may visualize planting strategy for the upcoming season.

In some embodiments, growers can take in the information presented related to allocation instructions and plant seeds based on the allocation instructions. The growers may operate as part of the organization that is determining the allocation instructions, and/or may be separate. For example, the growers may be clients of the organization determining the allocation instructions and may plant seed based on the allocation instructions.

5. Functional Overview—Determine Supply Based on Seed Placement Prescription

5.1 Demand Fulfillment Through Supply Chain

In some embodiments, the server is programmed to identify a supply chain for each of a plurality of hybrid seeds that may be produced. Generally, the server may represent a hybrid seed maker or a production site, although the server may also represent a distribution facility. The server may communicate with distribution computer systems that represent distribution agents or their facilities. The distribution computer systems may in turn communicate with grower computers that represent growers (seed planters) or their fields. The server and associated hybrid seed production site, the distribution computer systems and associated distribution facilities, and the grower computers and associated grower fields constitute the supply chain.

Each distribution facility may have unique characteristics, such as the location, delivery or storage capability, store management efficiency, desired service level, or expected revenue. These unique characteristics may determine which grower fields submit hybrid seed demands to a distribution facility and how much demand the distribution facility receives overall for each growing season. For example, a grower field might buy hybrid seeds from a distribution facility that is nearby, offers reasonable prices, can deliver the hybrid seeds within a certain time frame, and has a straightforward billing system. The unique characteristics may also determine whether the hybrid seed production site sends hybrid seeds to a distribution facility for sale. For example, the hybrid seed production site may prefer a distribution facility that strives to maintain a high service level, willing to pay premium prices, and tends to receive a large volume of aggregate demand. Therefore, hybrid seeds may travel in the supply chain from the production sites to the grower fields through various routes.

In some embodiments, the server is programmed or configured to determine one or more distribution facilities for each hybrid seed placement prescribed for a target field. For example, the server can be configured to select the distribution facility that is closest to a grower field and/or typically keeps the largest stock for the prescribed hybrid seed. For further example, the server can be configured to select the distribution facility with which the grower's field has had a relationship for a certain period of time. The server can be configured to further send information regarding the recommended one or more distribution facilities to the grower computer associated with the grower field to increase the chance that the demand of that grower field based on the prescription is met by a recommended distribution facility.

In some embodiments, the supply chain comprises no distribution computer systems or associated distribution facilities. Consequently, the server is programmed or configured to receive the demands from all the grower computers directly and can determine the supply to satisfy those demands in a relatively straightforward manner. In other embodiments, the supply chain may have a hierarchical structure comprising multiple levels. For example, instead of a flat list of distributors, there could be retailers who sell to grower fields and wholesalers who sell to retailers. The server can be configured to then map out the flow of demands from one level to the next, starting with the grower fields level.

5.2 Safety Stock Optimization

For the hybrid seed production site, the volume to produce for each hybrid seed is largely driven by demand. Each distribution facility receives an aggregate demand for a hybrid seed from one or more grower fields during an aggregation period, and the production site receives an aggregate demand from one or more distribution facilities. It would generally be one of the goals for the production site to completely fulfill the demand without producing extra supply. In reality, the production site would desire to estimate the demand for a future time as well as any risk associated with estimated demand. In some embodiments, the server is thus programmed to estimate the safety stock, which describes a level of extra stock that is maintained at the production site to mitigate the risk of stockouts (shortfall in raw material or packaging) and acts as a buffer stock in case sales are greater than planned and/or the seed producer is unable to deliver the additional units at the expected time.

A common approach for calculating the safety stock is based on several factors, including demand, lead time, service level, and forecast error. The demand (aggregate demand received from the distribution facilities) is to be modeled as one or more random variables. For example, it may be assumed that demand during successive unit time periods are independent and identically distributed random variables drawn from a normal distribution. In some embodiments, the demand from each distribution facility and the probabilistic attributes thereof can be estimated from forecasted aggregate demands of hybrid seeds received by each distribution facility in the supply chain, as noted above, and captured into a demand profile, as further discussed below. The lead time is the delay between when the reorder point (when an order is triggered from a low inventory level) is reached at a distribution facility and the time of renewed stock availability at the distribution facility. In certain embodiments, the lead time may depend on how long it takes to make and package the hybrid seeds at the production site and transport the hybrid seeds to a distribution facility. The service level may be related specifically to the desired probability of meeting the demand during the estimated lead time without a stockout. The forecast error is an estimate of how far the actual demand may be from the forecasted demand. In other embodiments, the forecast error may result from the discrepancy between recommended purchasing options—both the type and quantity of hybrid seeds and the choice of distribution facility—and actual purchase orders. The forecast error may account for some of the probabilistic aspects of the demand and the characterization of the forecast error may rely on historical demand patterns at the distribution facility or the grower fields.

FIG. 12 illustrates one example definition of a facility demand profile that characterizes aggregate customer demand during one or more aggregation periods at a distribution facility. This definition is in the form of a two-column table, where the first column 1220 includes the identifier of a type of data to be provided in the profile and the second column 1222 includes a description of the type of data. In some embodiments, the aggregation period can depend on how often the server is programmed to provide prescriptions of hybrid seed placements. For example, hybrid seed placements may be prescribed once every year for the growing season in each year. Thus, the aggregation period can be one year or a shorter period in which most of the prescription-triggered purchase orders are submitted following receipt of the prescriptions of hybrid seed placements.

In some embodiments, the first group of rows 1202 concerns basic data regarding the distribution facility in a specific period comprising one or more aggregation periods. Specifically, the "product name" could identify a specific hybrid seed. The second group of rows 1204 (having only one row) corresponds to the estimated aggregate demand for this specific period. The value for this row can also be estimated as the sum of quantities of prescribed hybrid seeds recommended to this distribution facility. Each quantity demanded by a grower's field can in turn be estimated from the prescribed hybrid seed density and the size of the grower's field. The third group of rows 1206 concerns data related to individual demands, such as the mean and the standard deviation calculated over all individual demands received over those aggregation periods where the aggregate demand is non-zero. The value for each of these rows can be estimated from the set of quantities of prescribed hybrid seeds recommended to this distribution facility. The fourth group of rows 1208 concerns data regarding aggregate demands for each aggregation period, such as the mean and the standard deviation calculated over all the aggregation periods. Assuming only one aggregation period in the specific period, the value for the mean can be similarly estimated as the sum of quantities of prescribed hybrid seeds recommended to this distribution facility. The value for the standard deviation, however, might need to be estimated from demand data related to multiple periods. Alternatively, the server can be configured to recommend not only a distribution facility but also an aggregation period in which to submit purchase orders of hybrid seeds to the distribution facility. The value for the standard deviation might then be estimated from the quantities of prescribed hybrid seeds recommended to this distribution facility during multiple aggregation periods within the specific period. The fifth group of rows 1210 further concerns data regarding demands for each aggregation period, such as a minimum and a maximum over all aggregation periods where the aggregate demand is non-zero. Similarly, the value for these rows might need to be estimated from demand data related to multiple periods or from the quantities of prescribed hybrid seeds recommended to this distribution facility during multiple aggregation periods within the specific period. The group of rows 1212 concerns data derived from the second group of rows 1204, including a total cost based on the total demand quantity.

In some embodiments, the supply chain comprises no distribution computer systems or associated distribution facilities. The facility demand profile can then be reduced to a customer demand profile for each grower field. The server can be programmed to estimate the aggregate demand and perform safety stock optimization directly from the prescribed hybrid seed placements. In other embodiments, the supply chain may have a hierarchical structure comprising multiple levels. The server can be configured to estimate the aggregate demand from the top-level distribution facilities by propagating up the demands all the way from the grower fields based on the prescribed hybrid seed placements, the recommended customer-facing distribution facilities, higher-level distribution facilities, and so on. The server can be configured to then perform safety stock optimization based on such aggregate demands.

In some embodiments, having built the facility demand profile or customer demand profile and determined values of certain other factors, such as lead time, service level, or forecast error, the server is programmed or configured to apply the common approach for safety stock optimization. The safety stock optimization can be performed according to a schedule, such as in November every year before the growing season in the following year. For the growing season in the first year, which is representative of having no stock for at least one hybrid seed at any of the distribution facility or the production site, the safety stock optimization can be performed mainly based on the prescribed hybrid seed placements for the first year and the corresponding facility demand profiles or customer demand profiles. The server is programmed to instruct enough production to satisfy the forecasted safety stock. In response to receiving prescriptions of hybrid seed placements and recommendations of distribution facilities, some grower computers might submit respective demands, such as purchase orders of specific quantities of specific hybrid seeds, to specific distribution facilities. The distribution computer systems might in turn submit respective demands corresponding to an aggregate demand submitted to the respective distribution computer systems. The server can be configured to thus determine how much the actual demands submitted by the distribution computer systems deviates from the forecasted demands and thus how much stock is left over at the production site after the growing season in the first year.

In some embodiments, the server is configured to also receive data from the distribution computer systems regarding leftover stock at the distribution sites or from the grower computers regarding the leftover stock at the grower fields. A leftover stock at a grower's field might result from bad weather, for example. A leftover stock at a distribution facility might result from trying to maintain an over-estimated safety stock. Assuming that the hybrid seeds in the leftover stock are still in good condition for the growing season in the second year, they should simply be used for that growing season before new seeds are produced.

In some embodiments, for the growing season in the second year then, the facility or customer demand profiles incorporate the impact of the leftover stock at the distribution facilities or the grower fields. The safety stock optimization can then be similarly performed based on the prescribed hybrid seed placements for the second year and the corresponding facility demand profiles or customer demand profiles. The server can then be programmed to instruct enough production to satisfy the forecasted safety stock minus the leftover stock at the production site. For the growing season in any subsequent year, the server is programmed or configured to follow the same process as described for the growing season in the second year.

5.3 Example Processes

FIG. 13 illustrates an example process performed by the server of managing supply of hybrid seeds based on hybrid seed placement prescriptions. FIG. 13 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

Steps 1302 through 1312 correspond to steps 1005 through 1334 illustrated in FIG. 10. Steps 1302 through 1312 could also be replaced by steps corresponding to steps 705 through 725 illustrated in FIG. 7. In some embodiments, in steps 1302 through 1312, the server is programmed to provide a prescription of a list of target hybrid seed placement for a grower field in terms of a total quantity to be planted on the grower field regardless of the size of the grower field or a seeding density, which can be converted into a total quantity considering the size of the grower field. The prescription instructs how to plant the list of target hybrid seeds typically for the next growing season. The server may be programmed to further provide a recommendation of how to obtain the list of hybrid seeds to be planted, as further discussed below.

In some embodiments, in step 1314, the server is programmed or configured to generate a prescription related to planting the list of target hybrid seeds in the one or more target fields for a next period, as discussed in section 4.4 above. The prescription may indicate a total quantity to be planted in the one or more fields or a seeding density, which can be converted to a total quantity based on the size of the one or more fields. The server can be configured to further transmit the prescription to a grower device associated with the one or more fields.

In some embodiments, in step 1316, the server is programmed or configured to determine a safety stock for a next period with respect to a supply chain based on the list of target hybrid seeds for the one or more target fields, as discussed in sections 5.1 and 5.2 above. With the safety stock for each hybrid seed generally depending on a probability distribution of the demand for the hybrid seed during each period, the server can be configured to estimate different parameters of the probability distribution based on prescriptions of hybrid seed placements over one or more periods. For maintenance of the safety stock, the server can also be configured to consider lead time, service level, additional demand forecast error margin, or other factors. For a supply chain comprising the server representing a hybrid seed production site or a distribution facility having more distribution facilities as customers, the server is programmed to address the added complexity of each distribution facility receiving demands from one or more grower fields or other distribution facilities and processing such demands in respectively distinct approaches. More specifically, the server can be configured to also select one or more distribution facilities for each grower field and send a recommendation of the selected distribution facilities to the grower device associated with the grower field. The server can be configured to then build or maintain a facility demand profile for each distribution facility that characterizes the receipt and processing of demands for hybrid seeds based on the prescriptions of hybrid seed placements for planting the hybrid seeds and recommendations of distribution facilities for obtaining the hybrid seeds to be planted.

In some embodiments, in step 1318, the server is programmed or configured to cause displaying values of the safety stock, thereby causing production of the safety stock, as also discussed in section 5.2 above. The server can be programmed to further convert the safety stock values into seed production instructions and transmit the safety stock values and/or the seed production instructions to agricultural or other implements at the seed production sites. The safety stock values may also include individual values for separate distribution facilities, and the server can be programmed to transmit recommendations of the individual values to the separate distribution facilities.

In some embodiments, after the next growing season is over, that growing season became the current growing season, and all the steps illustrated in FIG. 13 can be repeated to determine the safety stock for the subsequent growing season. The server can be programmed to consider additional data that has become available in the current period in determine how to manage its stock for this next period. The additional data includes the actual demands in the current period, such as actual orders of hybrid seeds received by the server. For example, the server can be configured to produce instructions for production systems to produce a smaller quantity of a hybrid seed than the value of the safety stock based on an estimated aggregate demand for the hybrid seed to utilize any leftover stock.

6. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of determining supply of hybrid seeds based on hybrid seed placement prescriptions, comprising:
    receiving, over a digital data communication network at an agricultural intelligence computer system associated with a production site of hybrid seeds, a dataset of candidate hybrid seeds for planting on one or more target fields, the dataset of candidate hybrid seeds comprising data regarding a plurality of hybrid seeds, probability of success values associated with each of the plurality of hybrid seeds that describe a probability of a successful yield, and a historical yield data for each of the plurality of hybrid seeds over multiple years, the historical yield data including a plurality of yield values, the agricultural intelligence computer system coupled in communication with an agricultural apparatus;
    receiving, over the digital data communication network, one or more properties for one or more target fields;
    selecting, by the agricultural intelligence computer system, a subset of the plurality of hybrid seeds based on the probabilities of success values associated with each of the plurality of hybrid seeds;
    generating, by the agricultural intelligence computer system, a representative yield value for each of the hybrid seeds in the subset of the plurality of hybrid seeds based on the historical yield data, the representative yield value including an average of yields from multiple different growing seasons of the hybrid seed;
    generating, by the agricultural intelligence computer system, risk values for the subset of the plurality of hybrid seeds, from the historical yield data, based on i) year-to-year yield variability of the yield values for the subset of the plurality of hybrid seeds over multiple years and ii) field-to-field variability of the yield values for the subset of the plurality of hybrids seeds, per year, over the multiple years;
    selecting, by the agricultural intelligence computer system, a list of target hybrid seeds, from the subset of the plurality of hybrid seeds, for planting on the one or more target fields based on the risk values and the representative yield values for the subset of the plurality of hybrid seeds, relative to a frontier curve threshold representative of yield versus risk; and then
    generating, by the agricultural intelligence computer system, a prescription related to planting the list of target hybrid seeds in the one or more target fields for a next period;
    determining, by the agricultural intelligence computer system, a safety stock for the list of target hybrid seeds for the next period with respect to a supply chain based on the prescription; and
    planting, by the agricultural apparatus, controlled by a cab computer, the list of target hybrid seeds in the one or more target fields consistent at least with the determined safety stock.

2. The computer-implemented method of claim 1, wherein the prescription indicates a number of bags of hybrid seeds or a hybrid seed planting density for one of the list of target hybrid seeds.

3. The computer-implemented method of claim 1, further comprising choosing one or more distribution facilities for the one or more target fields;
    wherein the agricultural apparatus is associated with the one or more distribution facilities.

4. The computer-implemented method of claim 3, wherein choosing the one or more distribution facilities is based on a location of the one or more distribution facilities, a price of the list of target hybrid seeds set by the one or more distribution facilities, or a prior relationship of the one or more distribution facilities with the one or more target fields.

5. The computer-implemented method of claim 1, further comprising:
    determining a leftover stock for the list of target hybrid seeds from a current period at the production site; and
    causing displaying values of the safety stock and values of the leftover stock.

6. The computer-implemented method of claim 1, further comprising identifying a leftover stock for the list of target hybrid seeds from a current period at a distribution facility or a grower field;
 wherein determining the safety stock for the list of target hybrid seeds for the next period is further based on the leftover stock.

7. The computer-implemented method of claim 1, wherein determining the safety stock for the list of target hybrid seeds for the next period is further based on a lead time, a service level, and forecast errors at the production site with respect to the supply chain.

\* \* \* \* \*